(12) United States Patent
Nelson et al.

(10) Patent No.: US 7,106,852 B1
(45) Date of Patent: Sep. 12, 2006

(54) TELEPHONE ACCESSORY FOR GENERATING CONVERSATION UTTERANCES TO A REMOTE LISTENER IN RESPONSE TO A QUIET SELECTION

(75) Inventors: Lester D. Nelson, Santa Clara, CA (US); Sara Bly, North Plains, OR (US)

(73) Assignee: Fuji Xerox Co., Ltd., Tokyo (JP)

( * ) Notice: Subject to any disclaimer, the term of this patent is extended or adjusted under 35 U.S.C. 154(b) by 357 days.

(21) Appl. No.: 09/658,612

(22) Filed: Sep. 8, 2000

(51) Int. Cl.
*H04M 1/00* (2006.01)
*H04M 9/00* (2006.01)

(52) U.S. Cl. .............................. 379/387.01; 379/67.1; 379/68; 455/412.1; 455/456.4

(58) Field of Classification Search ............. 379/88.05, 379/88.13, 93.23, 93.24, 162, 164, 165, 166, 379/202.01, 215.01, 67.1, 387.01, 68, 70, 379/80; 455/412.1, 456.4
See application file for complete search history.

(56) References Cited

U.S. PATENT DOCUMENTS

| | | | | |
|---|---|---|---|---|
| 4,241,521 A | 12/1980 | Dufresne | .................... | 434/112 |
| 4,515,995 A | 5/1985 | Bolick, Jr. et al. | ......... | 179/6.13 |
| 4,517,410 A | 5/1985 | Williams et al. | .......... | 179/6.04 |
| 4,577,067 A | 3/1986 | Levy et al. | ................ | 179/6.07 |
| 4,591,664 A | 5/1986 | Freeman | .................... | 179/6.06 |
| 4,661,916 A | 4/1987 | Baker et al. | ............. | 364/513.5 |
| 4,663,777 A | 5/1987 | Szeto | .......................... | 379/88 |
| 4,710,917 A | 12/1987 | Tompkins | .................... | 370/62 |
| 4,715,060 A | 12/1987 | Lipscher et al. | .............. | 379/70 |
| 4,834,551 A * | 5/1989 | Katz | ......................... | 379/67.1 |
| 4,985,913 A | 1/1991 | Shalom et al. | ................ | 379/76 |
| 5,029,214 A | 7/1991 | Hollander | .................... | 381/51 |
| 5,121,421 A | 6/1992 | Alheim | ........................ | 379/52 |
| 5,210,689 A * | 5/1993 | Baker et al. | ................... | 704/1 |
| 5,228,073 A * | 7/1993 | Smith | ........................ | 455/415 |
| 5,259,024 A | 11/1993 | Morley, Jr. et al. | ........... | 379/88 |
| 5,297,041 A | 3/1994 | Kushler et al. | ........ | 364/419.15 |
| 5,327,486 A * | 7/1994 | Wolff et al. | ............... | 379/93.23 |
| 5,604,786 A | 2/1997 | Engelke | ........................ | 379/52 |
| 5,615,257 A * | 3/1997 | Pezzullo et al. | ............ | 379/396 |
| 5,668,868 A | 9/1997 | Nordenstrom | .............. | 379/447 |
| 5,703,571 A | 12/1997 | Cannon | ..................... | 340/7.21 |
| 5,764,731 A | 6/1998 | Yablon | ........................ | 379/216 |
| 5,790,957 A | 8/1998 | Heidari | ....................... | 455/553 |
| 5,822,403 A | 10/1998 | Rowan | ......................... | 379/68 |
| 5,903,833 A | 5/1999 | Jonsson | .................... | 455/414.4 |
| 5,920,303 A | 7/1999 | Baker et al. | ................. | 345/133 |
| 5,950,123 A | 9/1999 | Schwelb et al. | ............ | 455/414 |
| 5,991,374 A | 11/1999 | Hazenfield | ............. | 379/101.01 |
| 6,009,333 A | 12/1999 | Chaco | .......................... | 455/456 |
| 6,014,429 A | 1/2000 | LaPorta | .................... | 379/88.15 |
| 6,018,671 A * | 1/2000 | Bremer | ....................... | 455/567 |
| 6,075,841 A | 6/2000 | Engelke | ........................ | 379/52 |

(Continued)

OTHER PUBLICATIONS

U.S. Appl. No. 09/657,370, filed Sep. 8, 2000, Nelson.

(Continued)

* cited by examiner

*Primary Examiner*—Bink K. Tieu
(74) *Attorney, Agent, or Firm*—Fliesler Meyer LLP

(57) ABSTRACT

A user conducts a telephone conversation without speaking. It does this by moving the participant in the public situation to a quiet mode of communication (e.g., keyboard, buttons, touchscreen). All the other participants are allowed to continue using their usual audible technology (e.g., telephones) over the existing telecommunications infrastructure. The quiet user interface transforms the user's silent input selections into equivalent audible signals that may be directly transmitted to the other parties in the conversation.

11 Claims, 22 Drawing Sheets

U.S. PATENT DOCUMENTS

| | | | |
|---|---|---|---|
| 6,078,650 A | 6/2000 | Hansen | 379/52 |
| 6,122,346 A * | 9/2000 | Grossman | 379/68 |
| 6,130,936 A * | 10/2000 | Hartmann | 379/142.01 |
| 6,175,819 B1 | 1/2001 | Van Alstine | 704/231 |
| 6,201,855 B1 * | 3/2001 | Kennedy | 379/33 |
| 6,219,413 B1 | 4/2001 | Burg | 379/215 |
| 6,266,685 B1 | 7/2001 | Danielson et al. | 708/141 |
| 6,301,338 B1 | 10/2001 | Makela | 379/67.1 |
| 6,332,024 B1 * | 12/2001 | Inoue et al. | 379/433.06 |
| 6,366,771 B1 | 4/2002 | Angle et al. | 455/414 |
| 6,389,114 B1 | 5/2002 | Dowens et al. | 379/52 |
| 6,393,272 B1 * | 5/2002 | Cannon et al. | 455/413 |
| 6,404,860 B1 | 6/2002 | Casellini | 379/88.17 |
| 6,408,063 B1 * | 6/2002 | Slotte et al. | 379/230 |
| 6,408,177 B1 | 6/2002 | Parikh et al. | 455/414 |
| 6,421,425 B1 | 7/2002 | Bossi et al. | 379/52 |
| 6,470,196 B1 * | 10/2002 | Yamashita | 455/567 |
| 6,490,343 B1 | 12/2002 | Smith, Jr. et al. | 379/52 |
| 6,496,692 B1 | 12/2002 | Shanahan | 455/418 |
| 6,510,325 B1 | 1/2003 | Mack, II et al. | 455/550 |
| 6,526,263 B1 * | 2/2003 | Saito | 455/107 |
| 6,535,296 B1 | 3/2003 | Oak | 358/1.15 |
| 6,577,859 B1 | 6/2003 | Zahavi et al. | 455/412 |
| 6,628,767 B1 | 9/2003 | Wellner et al. | 379/202.01 |
| 6,823,184 B1 * | 11/2004 | Nelson | 455/418 |
| 6,941,342 B1 | 9/2005 | Nelson | 709/204 |
| 2001/0039489 A1 | 11/2001 | Ford et al. | |
| 2001/0047429 A1 | 11/2001 | Seng et al. | |
| 2001/0055949 A1 | 12/2001 | Law et al. | |
| 2002/0055844 A1 | 5/2002 | L'Esperance et al. | |
| 2002/0181671 A1 | 12/2002 | Logan et al. | |
| 2003/0002448 A1 | 1/2003 | Laursen et al. | |
| 2003/0028330 A1 | 2/2003 | Freeland et al. | |
| 2003/0129997 A1 | 7/2003 | Steinbach et al. | |
| 2003/0138080 A1 * | 7/2003 | Nelson et al. | 379/88.16 |

OTHER PUBLICATIONS

U.S. Appl. No. 09/658,243, filed Sep. 8, 2000, Nelson.
U.S. Appl. No. 09/658,673, filed Sep. 8, 2000, Nelson.
U.S. Appl. No. 09/657,245, filed Sep. 8, 2000, Nelson.
"Automated Braille Display," *Appalachian State University,* http://www1.aapstate.edu/dept/physics/weather/braille_display.html and "JPEG Image," http://www1.appstate.edu/dept/physics/weather/proto5.jpg.
"ATI Announces New Software Solution for Professionals—EvaluWare™," *Assistive Technology, Inc.,* Jul. 30, 1999, http://www.assistivetech.com/p-multivoice.htm.
Brody, M., Cell Phones: Clever Communications But Etiquette Disconnect, http://www.microsoft.com/BIZ/features/advice/brody/archive/cellphones.asp.
Jacobson, D., "Release of TalkToMe! V1.0," macinsearch.com, Mar. 3, 1999, http://www.machinsearch.com/news/19990309/news_19990309.21650.5.shtml.
Marti, S. and Schmandt, C., "Active Messenger: filtering and delivery in a heterogeneous network," draft submited to *Ubicomp 2001,* http://www.media.mit.edu/~stefanm/thesis/ActiveMessenger_conf_2001_04_20_draft.pdf.
"Why Minspeak®," Prentke Romich Company, http://www.prentrom.com/speech/speech.html.
Nelson, D., "Time Marches on—just listen to it!," Apr. 2, 1999, http://www.modbee.com/metro/story/0%2C1113%2C73735%2C00.html.
"What is Portico?" http://www.conectus.com/portico/portico.asp.
"The Teleface Project," The Royal Institute of Technology, http://www.speech.kth.se/teleface/.
Phone-Fun Special Effects Machine, Shop Voyager.com, Catalog No. #TE2200, www.shopvoyager.com.
"TTS: Synthesis of audible speech from text," *AT&T Labs—Research,* 2000, http://www.research.att.com/projects.tts.
Babel Technologies, http://www.babeltech.com/.

"Welcome to Our Multilingual Text-to-Speech Systems," Lucent Technologies, Bell Labs Innovations, http://www.bell-labs.com/project/tts.
"TruVoice from Centigram," http://svr-www.eng.ca.ac.uk/comp.speech/Section5/Synth/truvoice.html.
"DIXI+ A Portuguese Text-to-Speech Synthesizer For Alternative and Augmentative Communication," *Instituto de Engenharia de Sistemas e Computadores* and *Centro de Linguistica da Universidade de Lisboa,* 1999-2001, http://www.speech.inesc.pt/~lco/dixiplus/abstract.html.
"Elan Text to Speech," *Elan Informatique,* http://www.elantts.com/speech/shared/ess2txt.htm.
"The Festival Speech Synthesis System," *The University of Edinburgh,* http://www.cstr.ed.ac.uk/projects/festival/.
"The Epos Speech Synthesis System," http://epos.ure.cas.cz.
"iSPEAK: Let your text be heard," Fonix Corporation, Sep. 2000, http://www.fonix.com/products/ ispeak. html.
"Speech Technology Group: Text-to-Speech Demo for Spanish(concatenative)," *GTH,* http://www-gth.die.upm.es/research/synthesis/synth-form-concat.html.
"German Festival,"*IMS Phonetik, Institute of Natural Language Processing,* University of Stuttgart, Germany, http://www.ims.uni-stuttgart.de/phonetik/synthesis.
"Hadifix," *Institute of Communications Research and Phonetics,* University of Bonn, Germany, http://www.ikp.uni-bonn.de/~tpo/Hadifix.en.html.
"IBM Voice Systems," http://www-4.ibm.com/software/speech.
"Speech Technology," *Microsoft Research,* http://research.microsoft.com/srg/.
"FLUET," *NTT Communication Science Laboratories,* http://www.kecd.ntt.co.jp/research/index.html.
OGI-Festival, http://www.cslu.cse.ogi.edu/tts/main.html.
Fister, Beat, "The SVOX Text-to-Speech System," Computer Engineering and Networks Laboratory, *Swiss Federal Institute of Technology,* Zurich, Sep. 1995, http://www.tik.ee.ethz.ch/~spr/SPGinfo/nodell.html, Pfi95, 4 pages.
"Magic Voice," Samsung AIT HCI Lab., http://hci.sait.samsung.co.kr.mvoice.
"About Say . . . " http://wwwtios.cs.utwente.nl.say/about_say.html.
"Speechsynthesis: the Multilingual Text-to-Speech System from Gerhard-Mercator-University Duisburg," http://sun5.fb9-ti.uni-duisburg.de/demos/speech.html.
Cohen, P.R., "The Role of Natural Language in a Multimodal Interface," *Proceedings of the First Annual ACM Symposium on User Interface Software and Technology,* 1992, pp. 143-149.
Thórisson, K.R., "Gandalf: An Embodied Humanoid Capable of Real-time Multimodal Dialogue with People," *Proceedings of the First International Conference on Autonomous Agents,* 1997, pp. 536-537.
Greenberg, S., "Teaching Human Computer Interaction to Programmers," vol. 3, No. 4, *ACM Interactions,* Jul.-Aug. 1996, ACM Press. pp. 62-76.
Baker, B. (Sep. 1982). "Minspeak: A Semantic Compaction System that Makes Self-Expression Easier for Communicatively Disabled Individuals," *Byte,* 7, pp. 186-202. (See Remarks).
Baker, B. (1986). "Using Images to Generate Speech," *Byte,* 11, pp. 160-168. (See Remarks).
Bruno, J. (1989). "Customizing a Minspeak system for a Preliterate Child: A Case Example," *Augmentative and Alternative Communication,* 5, pp. 89-100. (See Remarks).
Deegan, S. (Jun. 1993). "Minspeak: A Powerful Encoding Technique," *Communicating Together,* 11(2) pp. 22-23. (See Remarks).
L.M. Christianson et al., "A Hierarchical Audio Encoder for Network Traffic Adaptation," Proceedings of the SPIE-The International Society for Optical Engineering, pp. 124-131, 1999. **
Z. Lu et al., "An Efficient, Low-Complexity Audio Coder Delivering Muliple Levels of Quality for Interactive Applications," IEEE Second Workshop on Multimedia Signal Processing, pp. 529-534. **
M. Faloutsos et al., "Multicast Routing with Heterogrneous Quality," Fourth IEEE Workshop on High- Performance Communications Systems, pp. 125-132, Jun. 1997. **

Paper UI Version

TELEPHONE ACCESSORY FOR GENERATING CONVERSATION UTTERANCES TO A REMOTE LISTENER IN RESPONSE TO A QUIET SELECTION

FIELD OF THE INVENTION

The present invention relates to telecommunications.

CROSS-REFERENCES TO RELATED APPLICATIONS

The following co-pending U.S. patent applications are assigned to the assignee of the present application, and their disclosures are incorporated herein by reference:

Ser. No. 09/657,370, now U.S. Pat. No. 6,941,342 filed Sep. 8, 2000 by Lester D. Nelson, entitled, "METHOD FOR GENERATING CONVERSATION UTTERANCES TO A REMOTE LISTENER IN RESPONSE TO A QUIET SELECTION CALL."

Ser. No. 09/658,243, now U.S. Pat. No. 7,013,279 filed Sep. 8, 2000 by Lester D. Nelson, entitled, "PERSONAL COMPUTER AND SCANNER FOR GENERATING CONVERSATION UTTERANCES TO A REMOTE LISTENER IN RESPONSE TO A QUIET SELECTION."

Ser. No. 09/658,673, now U.S. Pat. No. 6,823,184 filed Sep. 8, 2000 by Lester D. Nelson, entitled, "PERSONAL DIGITAL ASSISTANT FOR GENERATING CONVERSATION UTTERANCES TO A REMOTE LISTENER IN RESPONSE TO A QUIET SELECTION."

Ser. No. 09/658,245 filed Sep. 8, 2000 by Lester D. Nelson, Daniel C. Swinehart, and Tomas Sokoler, entitled, "TELECOMMUNICATIONS INFRASTRUCTURE FOR GENERATING CONVERSATION UTTERANCES TO A REMOTE LISTENER IN RESPONSE TO A QUIET SELECTION."

BACKGROUND

A mobile telephone creates more opportunities for people to talk with each other, especially while in public places.

This expanded ability to converse has some negative aspects brought about by talk being an easy-to-use, expressive, and also noisy activity.

There are several ways that people attempt to deal with the situation of having private conversations while in a public place. First, individuals may be noisy in their conversation. This approach requires judgment about when privacy is not an overriding concern or when talk would be considered acceptable or too important to miss in a given situation.

Second, an individual may talk quietly. It is not uncommon to see a telephone user in a corner of the room in an attempt to shield a conversation. This is often inconvenient for the telephone users on both ends and again requires judgment to determine when this approach is working adequately.

Third, the individual may move the conversation elsewhere. It is not uncommon to see people leaving the room with a mobile telephone in hand. However, the movement itself is distracting, particularly when the telephone user's attention is focused on the conversation and not the motion (e.g. banging doors). The movement is also often accompanied by snatches of conversation (e.g. "Hello! how are you?", "Just a second").

Fourth, an individual may use an inaudible technology. Switching the conversation to a different modality, such as two-way text pager, is quiet. However, all parties to the conversation must be willing and able to switch to new modality.

Fifth, the individual may not take the call. Voicemail is a traditional way of dealing with calls when one is engaged. However, some telephone calls must be answered.

Sixth, in addition to the problems of privacy and disruption, recent observations of public uses of mobile telephones have revealed other disadvantages of mobile communications. Users may need to quickly, but informatively and politely, disengage from a conversation when their attention must immediately be elsewhere (e.g. listening to an important announcement, negotiating traffic).

Consequently, there is sometimes a need for the call to either be temporarily paused or fully discontinued appropriately by a very simple interaction.

Therefore, there is a desire to provide a system and method for conducting a telephone conversation in a public place without the above-identified disadvantages.

SUMMARY OF INVENTION

The present invention allows people to converse easily, expressively, and quietly while using mobile telecommunication devices in public.

A system for a telephone to provide conversation utterance to a remote listener in response to a quiet selection is provided. The system comprises a mechanical device associated with a conversation element. A memory is coupled to the mechanical device and stores an internal conversation element representing an audible utterance for a remote listener. A processor is coupled to the memory and the mechanical device. The processor generates an audio signal in response to a user interaction with the mechanical device and the conversation element.

According to another embodiment of the present invention, the mechanical device includes a first button.

According to still another embodiment of the present invention, the processor includes an audio generator.

According to yet another embodiment of the present invention, the system further comprises and impedance matching circuit coupled to the processor.

According to an embodiment of the present invention, the system comprises an earpiece coupled to the processor for receiving the audio signal and a voice of the remote listener.

According to another embodiment of the present invention, the system further comprises an audio output for coupling to a mobile telephone input

DETAILED DESCRIPTION

I. Overview

The method and system described herein (generally known as "Quiet Call" or "Quiet Call technology") moves a participant in a public situation to a quiet mode of communication (e.g., keyboard, buttons, touchscreen). All the other participants are allowed to continue using their audible technology (e.g., the telephone) over the normal telecommunications infrastructure. Embodiments of the present invention transforms the user's silent input selections into equivalent audible signals that may be directly transmitted to the other parties in the conversation (e.g., audio signal fed directly into a mobile telephone's microphone jack).

Figure 1:
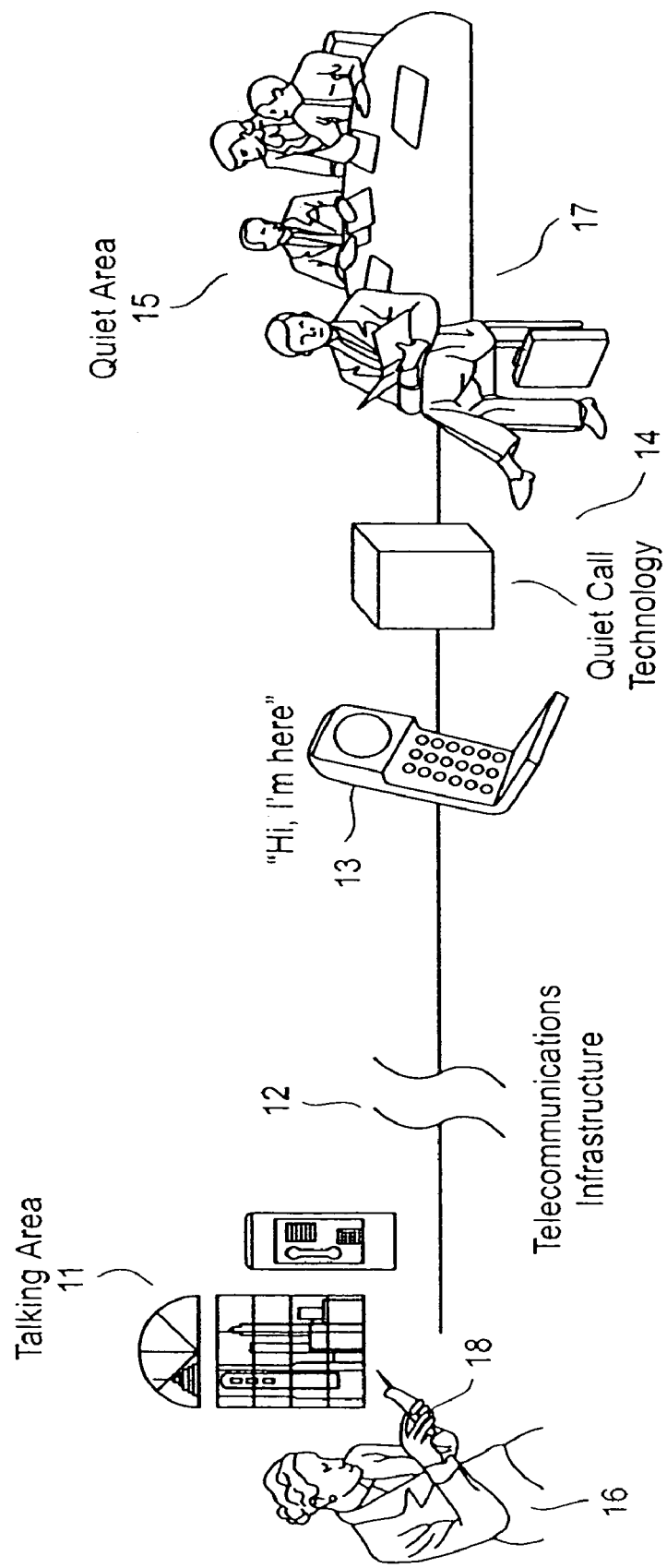
FIG. 1 illustrates a simplified block diagram of a Quiet Call system according to an embodiment of the present invention.

An embodiment of a Quiet Call system is illustrated in FIG. 1. System 10 includes a talking area 11 with an individual 16 and a quiet area or public area 15 with an individual 17. Individual 16 attempts to communicate with individual 17 over telecommunication infrastructure 12. Specifically, individual 16 uses a telephone 18 to dial a telephone 13 of individual 17. Quiet Call technology 14 allows for individual 17 to have an audible conversation with individual 16 in a quiet mode while not disturbing the interaction in quiet area 15.

A. Advantages

The present embodiments of the invention have at least the following advantages for both placing and receiving telephone calls. First, the conversation is quiet for a user in a quiet area. Non-audible input operations (pressing a key or button, touching a display) are translated into appropriate audio conversation signals.)

Second, the conversation is conducted audibly for other users in talking areas. Only the participants in public situations need select an alternate communication. Other users participate as in any other telephone call.

Third, the conversation permitted is expressive. Expressive representations for different kinds of conversations may be defined (e.g., lists of phrases suitable for greetings and answering basic questions—"yes," "no," "maybe," etc). Conversation structures may be predefined, recorded as needed, or synthetically generated on demand (e.g., text-to-speech).

Fourth, the communication interface is easy to use when a user is engaged in other activities. The interface includes conversation representations so that they may be easy to recognize (e.g., icon, text label) and invoke (e.g., point and click). One input selection (e.g., button press) may invoke a possibly complex sequence of responses supporting the dialogue (e.g., putting a person politely on hold or politely terminating the conversation).

Fifth, the communication interface is situation-appropriate. The interface is designed to fit unobtrusively into different public or quiet situations (e.g., a pen interface for meetings where note-taking is common). Telephone users often talk on the telephone and use pen/paper simultaneously (e.g., making notes in a day planner before hanging up, making use of lounge areas for printed materials and laptop during a conversation). The calling interface is designed to work with conversations intermixed with note-taking and reference activities.

Sixth, embodiments of the present invention operate within an existing communication infrastructure. An embodiment uses available resources that an individual is likely to have (e.g., PC, PDA, data-capable cellular telephone) and/or adding low-cost components to assist in the conversation transformations. The interface may be implemented on a wide variety of hardware that are interchangeable during or between calls and interoperable with each other over an existing communications channel (e.g., several participants in a conference call may have a different quiet-mode solutions).

A wide variety of private conversations may be supported in the following kinds of public, noisy or quiet situations, including a conference/trade show floor, general meetings (e.g., plenary sessions, keynotes), 'in line' situations (e.g., ticketing, registration, baggage claim), informational meetings (e.g., sales pitch, technical overview), large transit (e.g., bus, train, plane), lobby/waiting area, meetings where note-taking is required (e.g. technical session, product description), parking lot, personal transit (e.g., taxi, car pool, shuttle), restaurant, store (e.g., doorway, changing room, aisles), street, and the theater.

B. Communication Scenarios

A wide variety of communication scenarios are supported, including but not limited to the following. First, one can have general conversation, including simple question and answer, arranging for call back, and receiving information while in public.

Second, it is possible to hold topic-specific conversations, including questions and answers on selected, pre-defined topics such as agendas, status, and placing and receiving orders or instructions.

Third, it is possible to utilize call deferral (e.g., I'll-call-you-back or Just-a-second buttons).

Fourth, a Quiet Call embodiment can function as a mobile telephone answering machine (i.e., playback of greeting and listen to a recorded message from the caller).

Fifth, Quiet Call embodiments can screen calls (i.e., playback of greeting and listen to the caller before deciding to engage in the conversation).

Sixth, a Quiet Call embodiment acts as a represented presence, in which one party acts as an intermediary for people listening in remotely to an event or meeting. The represented presence is where a Quiet Call is in progress, but a Quiet Call user leaves a telephone's microphone on (not the usual mode for Quiet Calls) so the other caller can hear. That way the Quiet Call user can thus interact with the caller quietly, and in a sense could represent that person's interest (e.g., at a meeting) or could quietly get that person's opinions about the ongoing situation.

Seventh, Quiet Call is an activity reporter, where a button communicates via a quiet-mode interaction (e.g., click the 'Meeting' button on the Quiet Call interface and the telephone responds with "Hi, I'm . . . in a meeting . . . now. It should be over in about . . . 15 minutes . . . ").

C. A Quiet Call Conversation Example

Ed, a manager in a large engineering firm, is participating in a day-long quarterly review of the company's ongoing projects. He and a number of his peers have flown in to participate in a sequence of presentations and question/answer sessions.

At the same time, Ed's project is at an important decision point requiring comparative analysis of several different approaches. Sue, the technical lead on the project, is 'working the numbers' with the other project members. As the technical discussions proceed, Sue will require several different conversations with Ed to keep him informed of the progress and get his approval when needed. She knows that she can reach Ed through a Quiet Call system.

The first time Sue calls through, Ed has set his telephone for silent alert. Ed is about to raise a question, so he quickly defers the conversation with a single click that vocalizes to Sue "I can't talk right now, I'll call back ASAP." A Quiet Call system allows Ed and Sue to quickly defer a call without either spending unnecessary time in a voicemail system.

When Ed is available at the next change of speaker, he calls Sue and lets her know by silently issuing an audible command over the phone that he is still in quiet-mode. He does not want to step out of the room for the call because that would take too much time. Ed uses his earpiece to hear Sue convey her information. Ed signals his understanding and hangs up. When Ed makes the presentation on his own project, he has the most current technical information available. A Quiet Call system allows Ed to get information in an unobtrusive manner.

Later, the next time Sue calls, she requires a go/no-go decision from Ed. She gives her recommendation and Ed signals his approval. Ed then types in quick note that he will be free at 1:30 p.m. for a full debriefing. A Quiet Call text-to-speech function voices the message and they both hang up. A Quiet Call system allows Ed and Sue to exchange information easily and quickly.

Sue does not get a chance to call until 2:15 p.m. When she reaches Ed, he signals that he will be with her in a moment, because he was recently briefed on the project currently being presented. Ed detaches his telephone from the Quiet Call system by simply unplugging it, and quietly steps out of the meeting to talk on his mobile telephone as normal. A Quiet Call system allows Ed to switch conversation modes as needed while keeping the conversation flow going.

Late in the meeting, a new project is being introduced and Ed realizes that he and Sue have been working on some issues related to the decisions a project is making. Ed quickly telephones Sue and enables the microphone on his Quiet Call system so that Sue can listen in. Sue tells Ed that this new information is only relevant to them if the other project has a prototype built. Ed asks about the status of the development at the next opportunity. A Quiet Call system allows Ed to share information in an unobtrusive and interactive manner.

As Ed is waiting in the airport at 5:30 p.m. for his shuttle home, he checks in with Sue. He doesn't want the crowded lobby to know his business, so he plugs in a Quiet Call system and reviews the day's events with Sue. As they are talking, an announcement on the loudspeaker begins concerning flight delays. Ed quickly pauses the conversation, letting Sue know with one button push that he has been interrupted. A Quiet Call system allows Ed to converse privately and to attend to the events in his surroundings when necessary.

II. A Quiet Call System

A Quiet Call conversation as described here is an electronically assisted discussion (e.g., a telephone call) being held between two or more parties that has the following attributes:

The conversation is being expressed at least in part vocally (e.g., via telephone, cellular telephone, Internet telephone, videophone, two-way radio, intercom, etc.).

One or more parties in the conversation is located in a situation where talking is inappropriate, unwanted, or undesirable for whatever reason (e.g., meeting, theater, waiting area, etc.).

Consequently, one or more parties in the discussion uses an alternative, quiet mode of discussion (e.g., keyboard, buttons, touchscreen, etc.) to produce the audible content of the discussion that is transformed into an equivalent electronic representation that may be silently transmitted to the other parties in the conversation.

The term Quiet Call technology is used here to signify the communication mechanism, including hardware and/or software, that allows people to converse easily, expressively, and quietly while out in the world. A quiet-mode conversation or quiet call is a conversation conducted using this technology.

In an embodiment of the present invention, two Quiet Call modes of operation are defined: 1) Conducting a Quiet Call and 2) Preparing for a Quiet Call.

A. Conducting a Quiet Call

Figure 3:
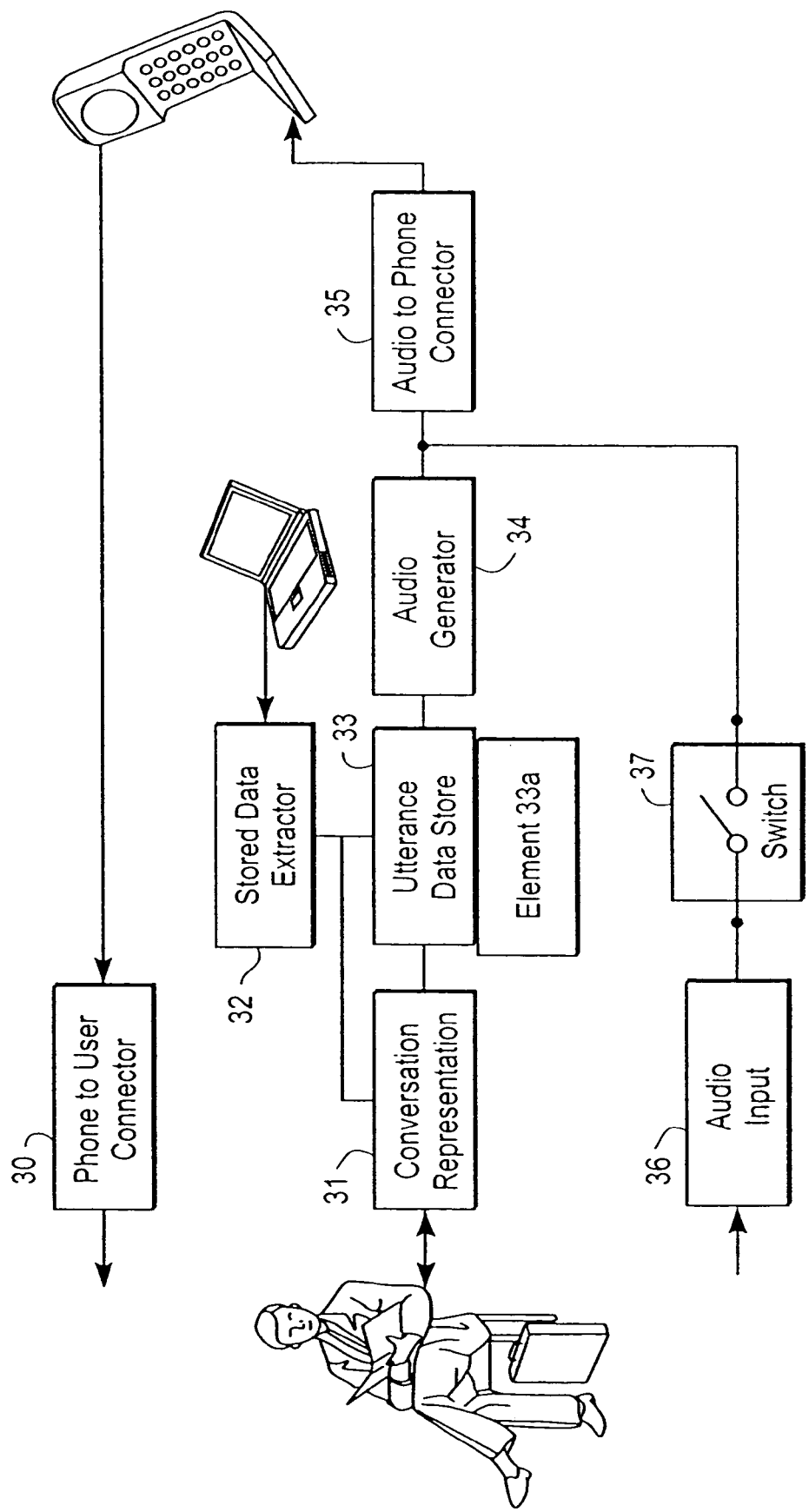
FIG. 3 illustrates a simplified block diagram of conducting a conversation with Quiet Call system according to an embodiment of the present invention.

FIG. 3 is a simplified block diagram of the components structure in a Quiet Call system embodiment used for conducting a quiet call. In this mode, a user conducts a mobile telephone conversation while at the same time causing no audible content produced directly by the local user to the local area because the local user is not audibly speaking. Example uses of the Quiet Call system in this mode include silent communications while in a meeting and holding private conversations in public environments.

Figure 7:
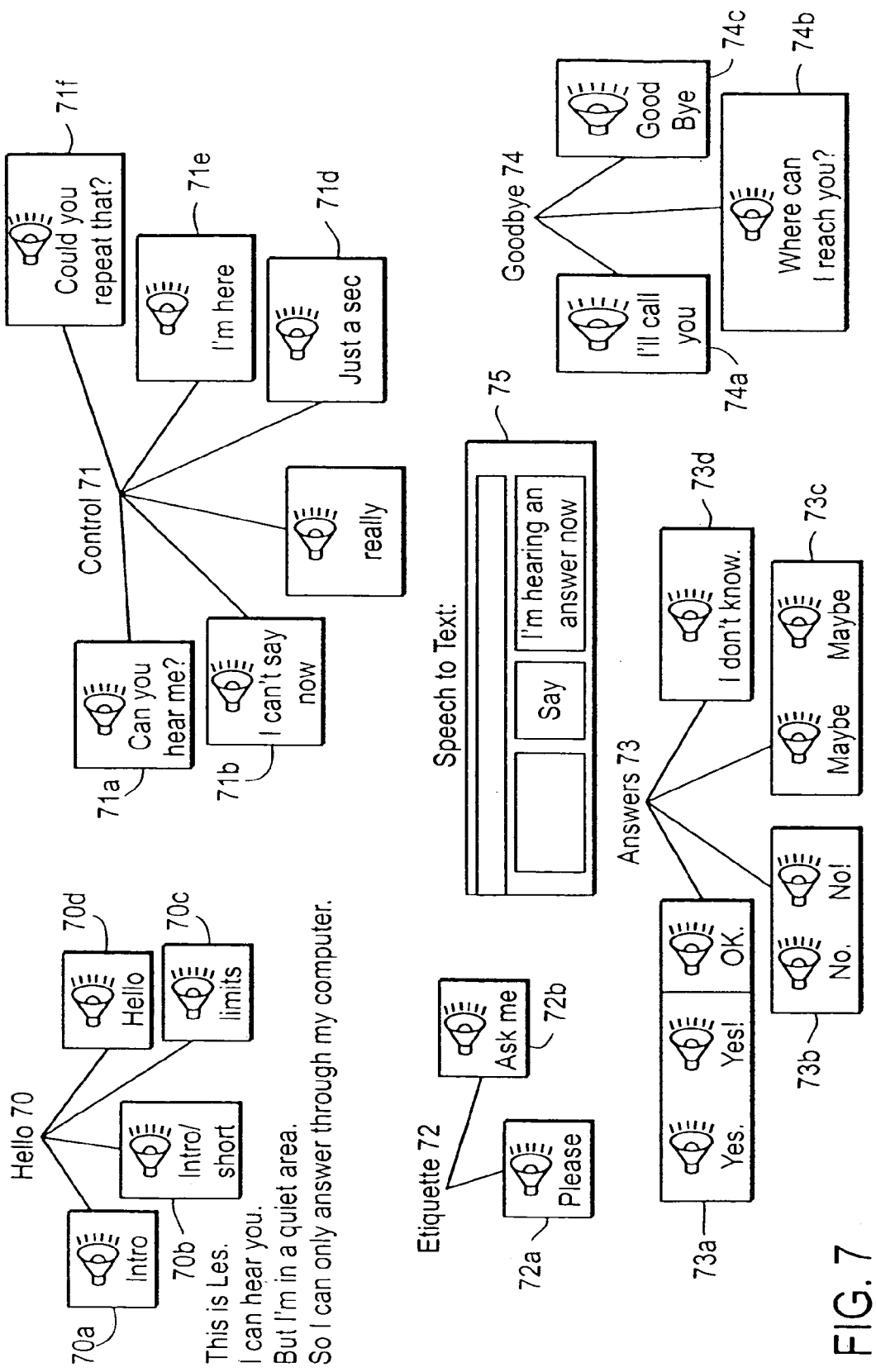
FIG. 7 illustrates a Quiet Call graphical user interface ("GUI") according to an embodiment of the present invention.

A user views a conversation representation as illustrated by block 35 in FIG. 3, and makes selections about utterances which are to be voiced over the telephone. In an embodiment, conversation representation 31 may be icons having text labels as illustrated in FIG. 7. A Conversation Element 33a associated with conversation representation 31 is stored in an utterance data store 33, that when selected are retrieved and submitted to an audio generator 34 to produce the output signals needed for the telephone connection. An audio-to-phone connector 35 provides this electrical connection. A telephone-to-user connector 30 allows the user to hear both the conversation generated by the system and other users. In an embodiment, a telephone-to-user connector is an earpiece. A switchable (switch 37) audio input 36 allows a user to voice directly into a telephone when appropriate. A stored data extractor 32 converts data stored in other formats (e.g., PC calendar entries, address books) into a format suitable for audio generation.

The following describes components in a Quiet Call system embodiment.

i. Quiet Call System Components a. Conversation Representation

A conversation representation 31 of a conversational element 33a (i.e., phrases, words, letters, numbers, symbols, sound effects, and sequences and/or a combination thereof) that a user may invoke for initiating conversation utterances is displayed to a user. An example of a conversation representation GUI is illustrated in FIG. 7.

A conversation representation 31 may take any form that does not require a user to vocalize a selection of a conversation element 33a, including graphical (e.g., icons, symbols, figures, graphs, checkboxes, buttons, other GUI widgets, and sequences and/or a combination thereof), textual (e.g., displayed text, labeled input forms, and sequences and/or combinations of the above), and physical (e.g., buttons, switches, knobs, labels, barcodes, glyphs, braille or other tangible representation, electronic tags, and sequences and/or a combination thereof).

A user interacts silently with each conversation representation 31 by inspecting it according to its kind (e.g., visually or tactually) and invoking it according to its kind (type, point and click, press, eye tracking, scanning, etc.).

A conversation representation 31 may be presented using one or more display surfaces (e.g., computer display, touchscreen, paper, physical device, etc.) or display forms (e.g., pages, frames, screens, etc.). When multiple surfaces or forms are used these may be organized in different ways according to user needs (sequentially, hierarchically, graph-based, unordered, etc.). A user selects between different surfaces or forms according to its kind (e.g., GUI selection, physical manipulation such as flipping or turning, button press, etc.).

A user may update a conversation element 33a and an associated conversation representation 31 in a visible display as follows. First, an individual can add a new conversational element and/or an associated conversation representation.

Second, an individual can delete a conversational element and/or an associated conversation representations.

Third, an individual can change the kinds of conversation representations of conversational elements (e.g., text, label, icon).

Fourth, an individual can change a conversation representation of a conversational element according to its kind (e.g., text values, label values, icon images).

Fifth, an individual can change a conversational element associated with one or more conversation representations.

Sixth, an individual can add, delete, or modify the association of a conversational element and its conversation representation.

Seventh, an individual can invoke upload/download for conversational elements, their display conversation representations, and associated internal representation.

Eighth, an individual can invoke record and playback capabilities for selected conversational elements.

b. Utterance Data Store

Each conversational element (i.e., phrases, words, letters, numbers, symbols, sound effects, and sequences and/or combinations of the above) has one or more internal representations suitable for creation of audible utterances that may be communicated over a telephone line. Conversational element 33a stored in utterance data store 33 includes, for example, sound file formats, record and playback formats, text, MIDI sequences, etc. These internal representations may be stored in and retrieved from utterance data store 33. In an embodiment, utterance data store 33 is readable and writeable computer memory as known in the art. Retrieval may be accessed randomly, sequentially, by query, or through other such known methods. Data for retrieved conversation elements are passed to an audio generator 34.

c. Audio Generator

An audio generator 34 transforms the internal representations of conversational elements into audible formats suitable for transmission over a telephone connection. In an embodiment, audio generator 34 is a text-to-speech generator, sound card, sound effects generator, playback device, in combination and/or an equivalent.

d. Audio Input

Direct audio connection (e.g., microphone) at the locale of the user may be optionally invoked by a switching 37 (e.g., pushbutton or other physical switch, software switch (e.g., GUI widget), acoustic muffling (e.g., soundproof housing or other insulation), and direct electrical connection (e.g., plug).

Audio recording into an utterance data store may be made by selecting one or more elements from the conversational representation and invoking a record command.

e. Audio Output

Audio output 41 allows for audio generation from an utterance data store 33 by selecting one or more elements from a conversational representation 31 and invoking a playback command.

f. Audio-to-Phone Connector

A connection is provided between user conversational inputs generated from the switchable audio input 36 or audio generator 34 that delivers signals appropriate for telephone transmission while causing no audible content produced directly by the local user to the local area. This includes direct electrical connection of signals, electronically processed signals such as an impedance matching circuit, optical to electrical conversion such as infrared detection, muffled acoustic signals using a soundproof housing or other insulation.

Figure 5:
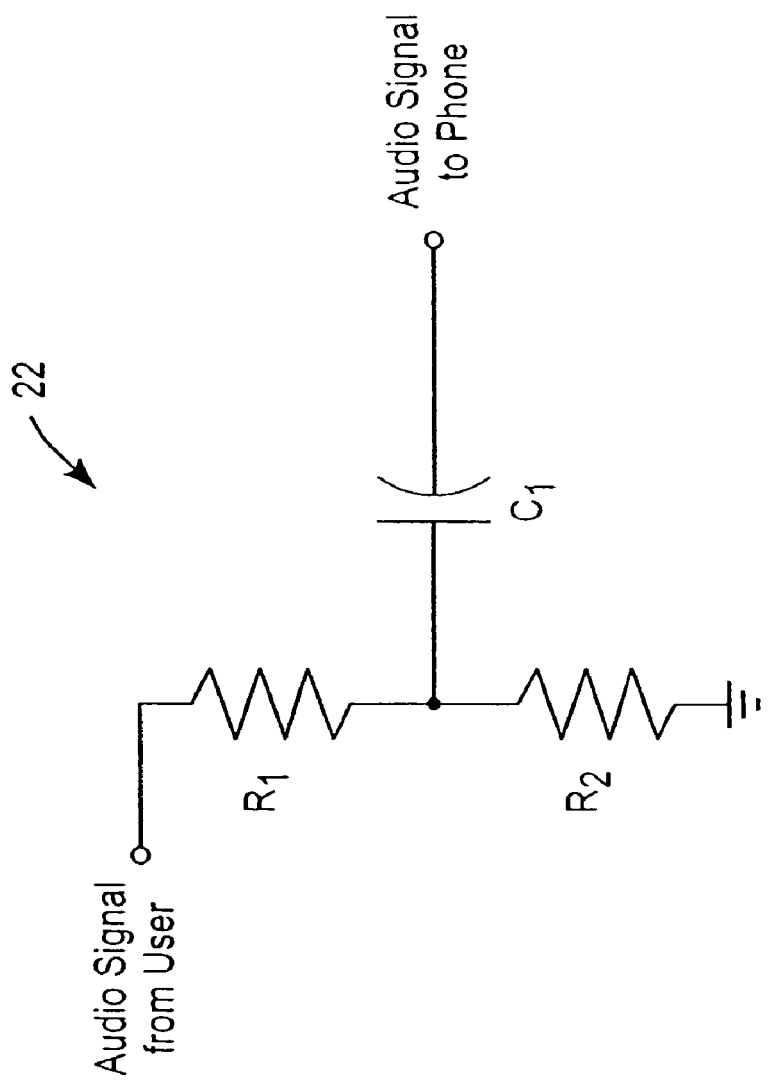
FIG. 5 is an impedance matching circuit schematic according to an embodiment of the present invention.

FIG. 5 illustrates an impedance matching circuit 22. Resistances $R_1$ and $R_2$ are selected to match the input and output signals. The Capacitor $C_1$ eliminates some of the signal interference (voltage blanking for DC component).

g. Phone-to-User Connection

Direct audio connection (i.e., earpiece) is provided from a telephone to a user while at the same time causing no audible contact produced directly by a local user to the local area. In an embodiment, telephone-to-user connector 30 includes an earpiece or other localized speaker system that is connected directly to the telephone or through some intermediate electronics (e.g., PC and soundcard).

h. Upload/Download

Data for conversational elements, their display conversation representations, and associated internal representation may be uploaded and downloaded between the Quiet Call system and other systems, including other Quiet Call systems, external memory devices (e.g., Compact Disc ("CD"), Digital Video Disc ("DVD"), personal digital assistants), directly connected computers and networked computers (e.g., local area, wide area, Internet, wireless, etc.). Connection may be made by serial connection (RS232, IrDA, ethernet, wireless, or other interconnections known in the art). Upon invocation of the upload command from a conversation representation 31 and/or utterance data storage 33, formatted data (e.g., raw byte data, rich text format, Hypertext Markup Language, etc.), are transmitted (e.g., TCP/IP, RS-232 serial data, etc.). Upon invocation of the download command, a conversation representation 31 formatted for stored data (conversational representation format, utterance data storage format), is sent to the appropriate Quiet Call components (conversational representation 31, utterance data storage 33).

i. Stored Data Extractor

Data for conversational elements, their display conversation representations, and associated internal representation may be extracted from stored information on a host computer. For example, calendar entries in a Microsoft Outlook format may be dragged from an application to a store data extractor 32 form that parses and represents the calendar data. In this case, an Appointment object is accessed and its fields interrogated (e.g., Subject, Start, etc.). Text strings are extracted from the fields and a conversational phrase is formatted from these fields and phrase template. A template takes the form of some predefined text with slots for the appropriate data to be inserted:

"An appointment for <subject> is scheduled to start at <start>", where the slots <subject> and <start> are supplied by text from the Appointment object.

Text-to-speech generation or special-purpose, predefined audio vocabularies may then be used to vocalize the appointment information. Other types of extracted data may include address book entries, database records, spreadsheet cells, email messages, driving directions, information pointers such as path names and universal resource locators and all manner of stored, task-specific information.

B. Preparing for Quiet Call

Figure 4:
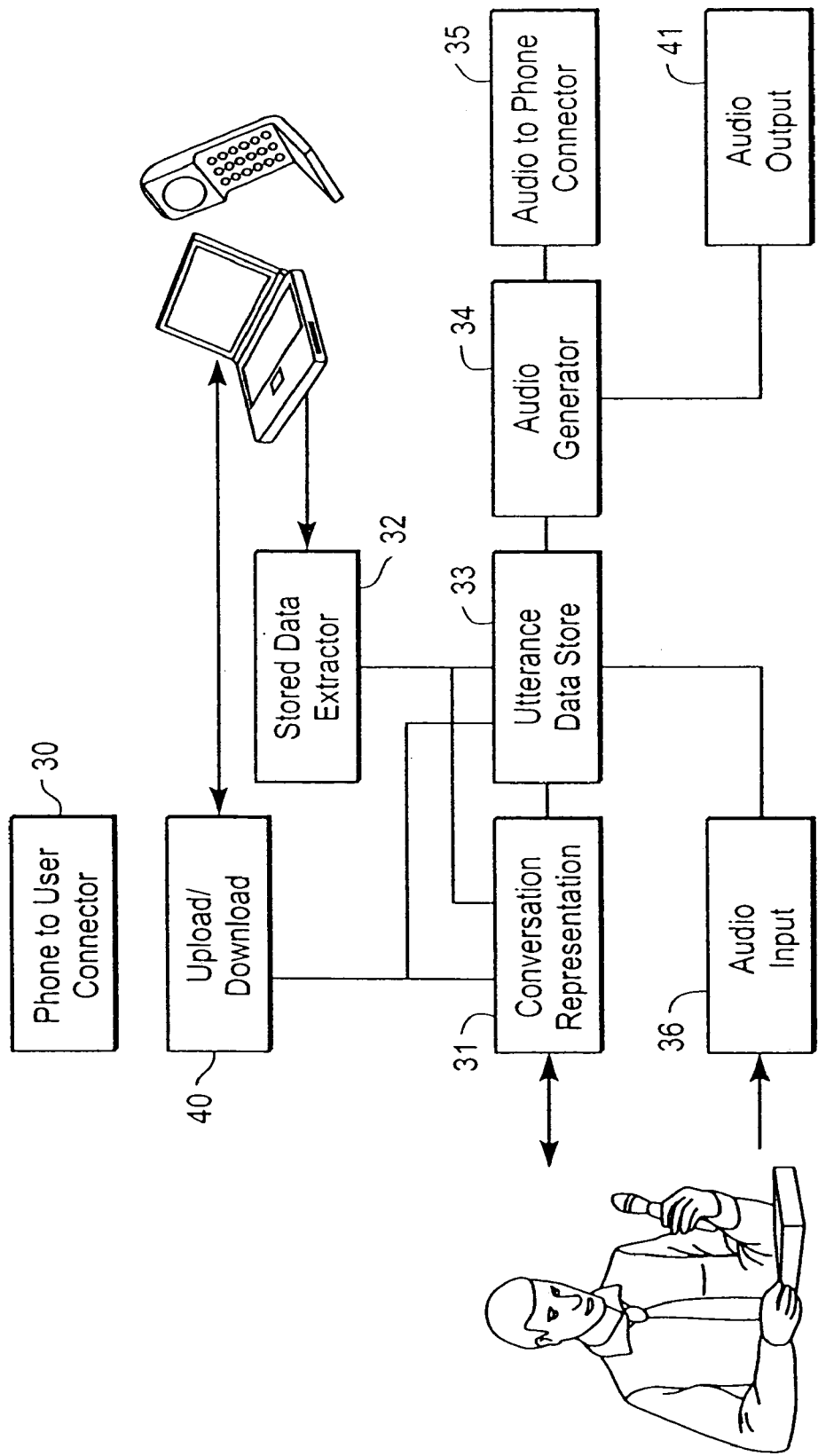
FIG. 4 illustrates a simplified block diagram for preparing Quiet Call conversation structures according to an embodiment of the present invention.

FIG. 4 illustrates the components in a Quiet Call system embodiment used for preparing conversation structure. In this mode the user or someone acting on behalf of the user prepares for a quiet-mode conversation by adding, deleting, or modifying conversation structures (representations, elements and internal representations) stored within a Quiet Call system.

A user views a conversation representation 31 and makes selections about updating the utterances to be voiced over the telephone (e.g., add, modify, delete elements). The utterance data store 33 is updated appropriately. An upload/download produces the output signals to an audio output 41 to allow the user to check the stored conversation. A store data extractor 32 converts data stored in other formats (e.g., PC calendar entries, address books) into a format suitable for inclusion into utterance data store 33.

III. Quiet Call Method

Figure 6:
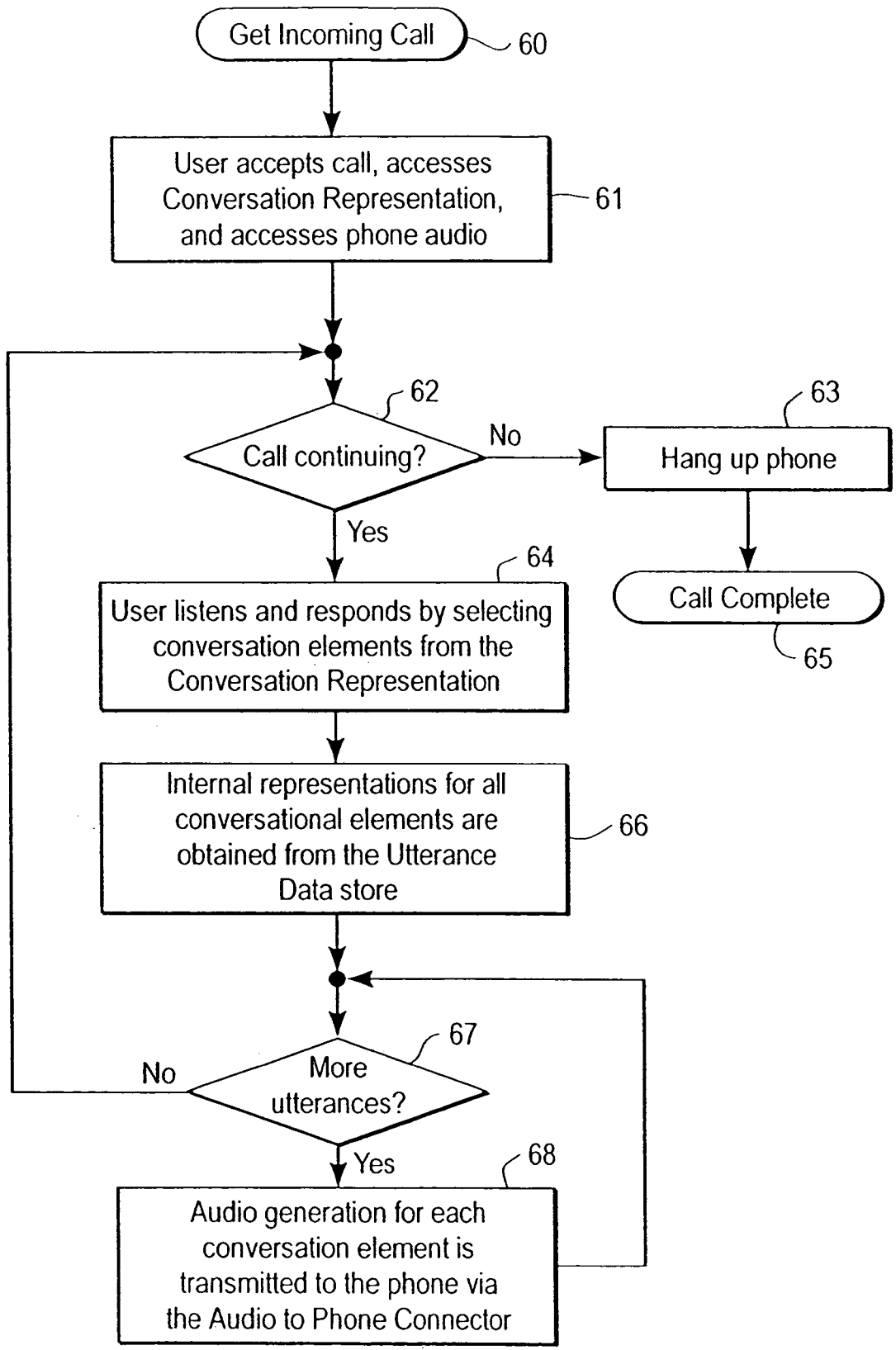
FIG. 6 is a Quiet Call flowchart according to an embodiment of the present invention.

In an embodiment, a quiet-mode conversation is conducted according to the flowchart illustrated in FIG. 6.

As one who is skilled in the art would appreciate, FIG. 6 illustrates logic boxes for performing specific functions. In alternate embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

Figure 15:
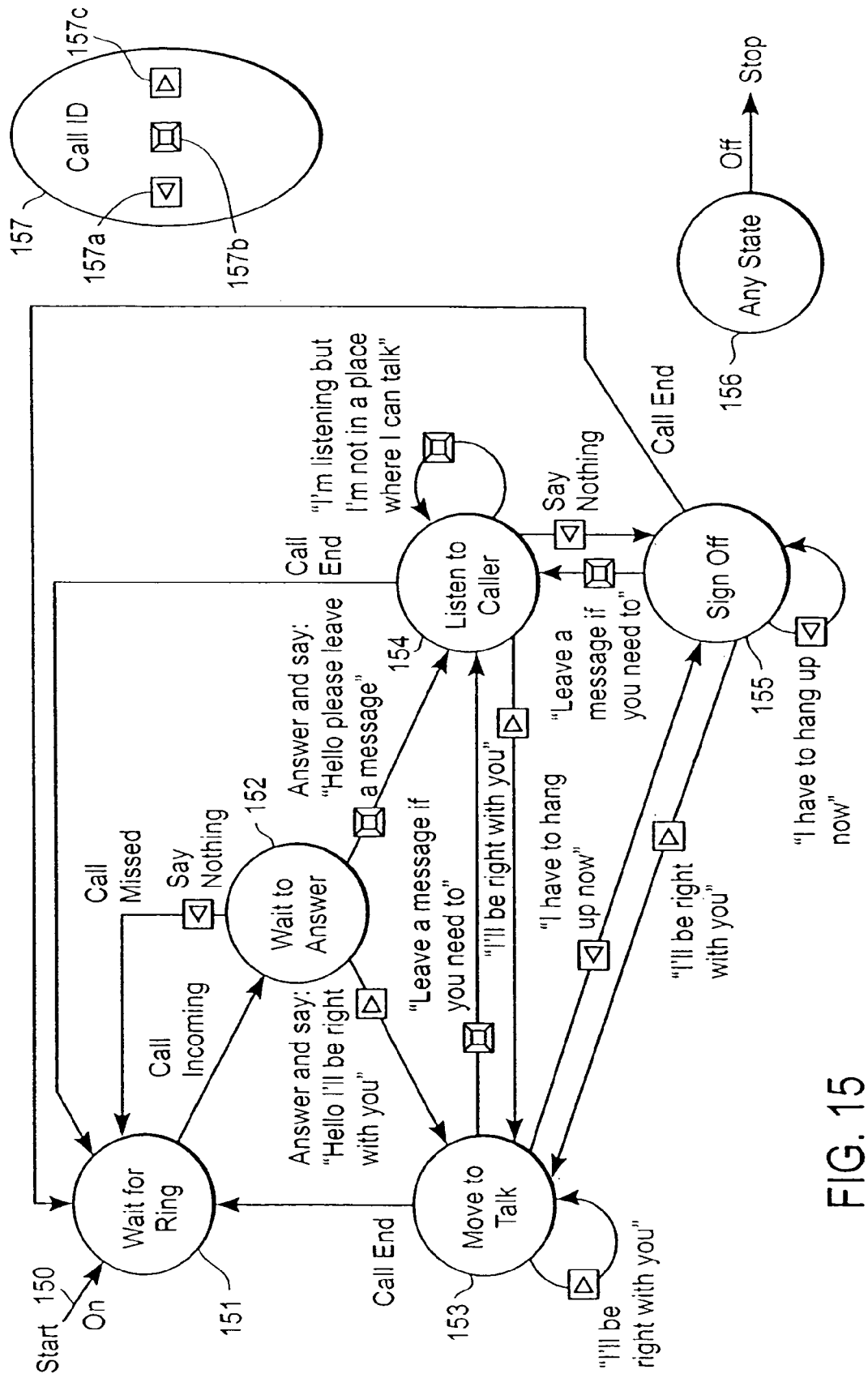
FIG. 15 illustrates a Quiet Call state diagram according to an embodiment of the present invention.

In an embodiment of the present invention, quiet call software illustrated by FIGS. 6 and 15 is stored in an article of manufacture, such as a computer readable medium. For example, quiet call software may be stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

In an alternate embodiment, Quiet Call software is downloaded using Hypertext Transfer Protocol ("HTTP")1 to obtain Java applets.

An incoming call is received by a user as represented by elliptic block 60. The user then accepts the call and accesses conversational representations as illustrated by logic block 61. A determination is then made by the user whether to continue the call as illustrated by decision block 62. If the user does not wish to continue a call, the telephone is hung up as illustrated by logic block 63, and the current call is complete as illustrated by elliptic block 65. If the user wishes to continue the call, the user listens and responds by selecting conversation elements from a conversational representation 31 as illustrated by logic block 64. Internal representations of all the conversational elements are obtained from an utterance data store 33 as illustrated by logic block 66.

A decision is made by an individual whether additional utterances will be selected as illustrated by decision block 67. If no further utterances are needed, logic transitions to logic block 68 where the audio generation of each conversational element is transmitted to the telephone via the audio-to-phone connector 35. Logic then transitions back to decision block 67.

The normal telephone call process proceeds as indicated in the flow chart. Exceptional situations in the Quiet Call method may occur asynchronously as follows: 1) Whenever the user wants live audio to be incorporated into the telephone call, the switchable audio input 36 is engaged; 2) The user is able to override the currently playing conversational element by making a new selection from a conversation representation 31; and 3) The user may hang up the telephone at any time to terminate the conversation.

FIG. 15 illustrates a state transition diagram for a quiet call embodiment of the present invention. In particular, FIG. 15 illustrates a state transition diagram in which a mechanical device 157 having left button 157*a*, center button 157*b* and right button 157*c* are used to transition into the various states. Buttons 157*a–c* are conversation representations for conversation elements. The buttons may represent different conversation representations at different states. In an embodiment of the present invention, FIG. 5 illustrates a state transition diagram of quiet call software.

In the illustrated embodiment, five states are present: a wait-for-ring state 151, a wait-to-answer state 152, a move-to-talk state 153, a listen-to-caller state 154, a sign off state 155, and an any state 156. A user can transition to the various states by pressing buttons 157a–c. As the various states are transitioned, audible messages to a user maybe generated.

For example, a transition from the wait-for-ring state 151 to the wait-to-answer state 152 is accomplished on the occurrence of an incoming call event. A user then has three options: the user may say nothing by pressing button 157a; the user may generate "Hello, please leave a message" utterance by pressing button 157b; or, finally, the user may generate a "Hello, I'll be right with you" utterance which is heard only by the caller by selecting right button 157c.

As can be seen by FIG. 15, embodiments of the present invention allow a user to conduct a conversation while causing no audible content to the local area.

IV. Quiet Call Embodiments

In a quiet mode conversation, all sides of the conversation use an electronic device, such as a mobile telephone. The device may be a wired or a wireless device. But the person in the 'unequal' public situation (i.e., having to be quiet) would have a special interface for responding to the conversation. Five different embodiments are described below: (1) a PC, (2) a PDA, (3) a scanner and paper interface, (4) a telephone accessory device having a physical button interface, and (5) a telecommunications infrastructure having Quiet Call capability. Other embodiments may include using an intercom, CB radio, two-way radio, shortwave radio, or other radio transmitter such as FM or Bluetooth, etc.

A. PC Embodiment

A PC system embodiment for making Quiet Calls uses a personal computer as a private 'conversation appliance.'

In a PC embodiment, a GUI template having a conversation representation is stored in the PC. A user, such as individual 17, points and clicks, and the computer 'talks' silently into the telephone through an audio connection.

This is accomplished by storing the pre-recorded conversational phrases of interest in a format suitable for display and selection by the user. FIG. 7 shows a GUI representation that contains conversational representations having internal representations expressed in the user's own voice. For example, a collection of Hello 70 icons are represented as icons 70a–d. A user may pre-record an intro 70a such as: "This is Les. I can hear you, but I am in a quiet area so I can only answer through my computer." Other types of icons and associated text may also be used. For example, control 71 icons may include icons 71a–f. Etiquette 71 icons may include icons 72a–b. For example, icon 72a may be an audible expressive "please" in the user's voice. Answer icon 73 includes icons 73a–d, and "Good-bye" icon 74 includes icons 74a–c.

In an embodiment, Microsoft PowerPoint is used to form conversation representations and conversation elements: (1) a graphical structure, as illustrated by FIG. 7, whose nodes contain audio clips (WAV format); and (2) a text-to-speech generator (derived from an Active X component containing Microsoft Agent speech functionality). Microsoft Agent software includes text-to-speech functionality. Using standard Microsoft interface definitions (e.g. Active X component), Microsoft Agent text-to-speech functionality is embedded into a PowerPoint slide and is used as a Quiet Call GUI providing text-to-speech functionality for Quiet calls.

Conversational templates may be shared (e.g., as Web pages, shared files, e-mail messages) between a group of frequent user's (e.g., uploaded/downloaded). Individuals pick and choose the type of conversation in which they wish to engage and each works through a shared template using the Quiet Call interfaces.

Figure 2:
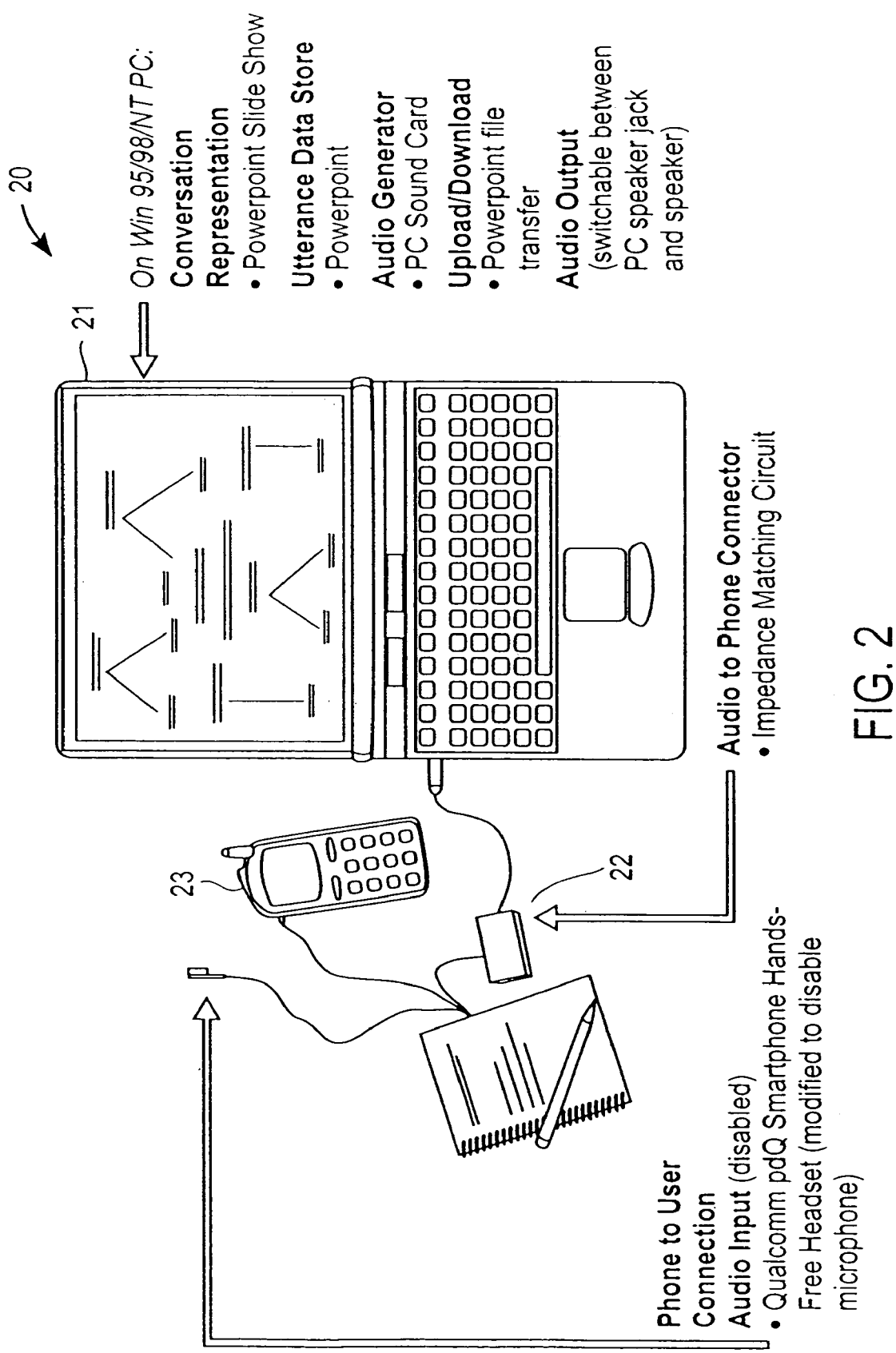
FIG. 2 illustrates a Quiet Call personal computer ("PC") according to an embodiment of the present invention.

FIG. 2 illustrates a Quiet Call PC system embodiment. System 20 includes a PC 21 having sound card which is connected to the input jack of a mobile telephone input. With the mobile telephone jack thus engaged, no audible content is produced directly by the local user to the local area. The user has an earpiece which allows the telephone conversation and the audio generated by the PC to be heard together.

In an embodiment, personal computer 21 includes conversation representation 31, utterance data store 33, audio generator 34, upload/download 40 and audio output 41 as described above. In an embodiment of the present invention, conversation representation 31 is a power point slide show. Likewise, in an embodiment of the present invention, utterance data store 33 is a power point representation. Similarly, audio generator 34 and upload/download 40 is a PC sound card and power point file transfer software, respectively.

Audio output 36 is switchable between the PC speaker jack and the PC speaker. The PC speaker is disengaged while the speaker jack is in use. The PC speaker jack is coupled to an audio-to-phone connector 35. The generated conversation may be made audible in the user locale (e.g., as part of the preparation process) by removing the plug from the PC speaker jack. In an embodiment of the present invention, the audio-to-phone connector 22 is an impedance matching circuit as illustrated in FIG. 5. An impedance matching circuit permits the PC audio signals to be directed into the mobile telephone. In an embodiment, $R_1=10K$ ohms, $R_2=460$ ohms, and $C_1=0.1$ microfarads. The audio-to-phone connector 35 is then coupled to a mobile telephone 23 audio input.

In an embodiment of the present invention, the mobile telephone 23 is a QualComm pdQ Smartphone with hands-free headset in which we replace the microphone with a direct connection to the audio-to-phone connector 22.

B. PDA Embodiment

In a PDA embodiment, a GUI conversation representation is stored on PDA 80 and displayed on a PDA screen. The user taps the conversation buttons and the PDA 'talks' silently into the telephone through an audio connection.

Figure 8:
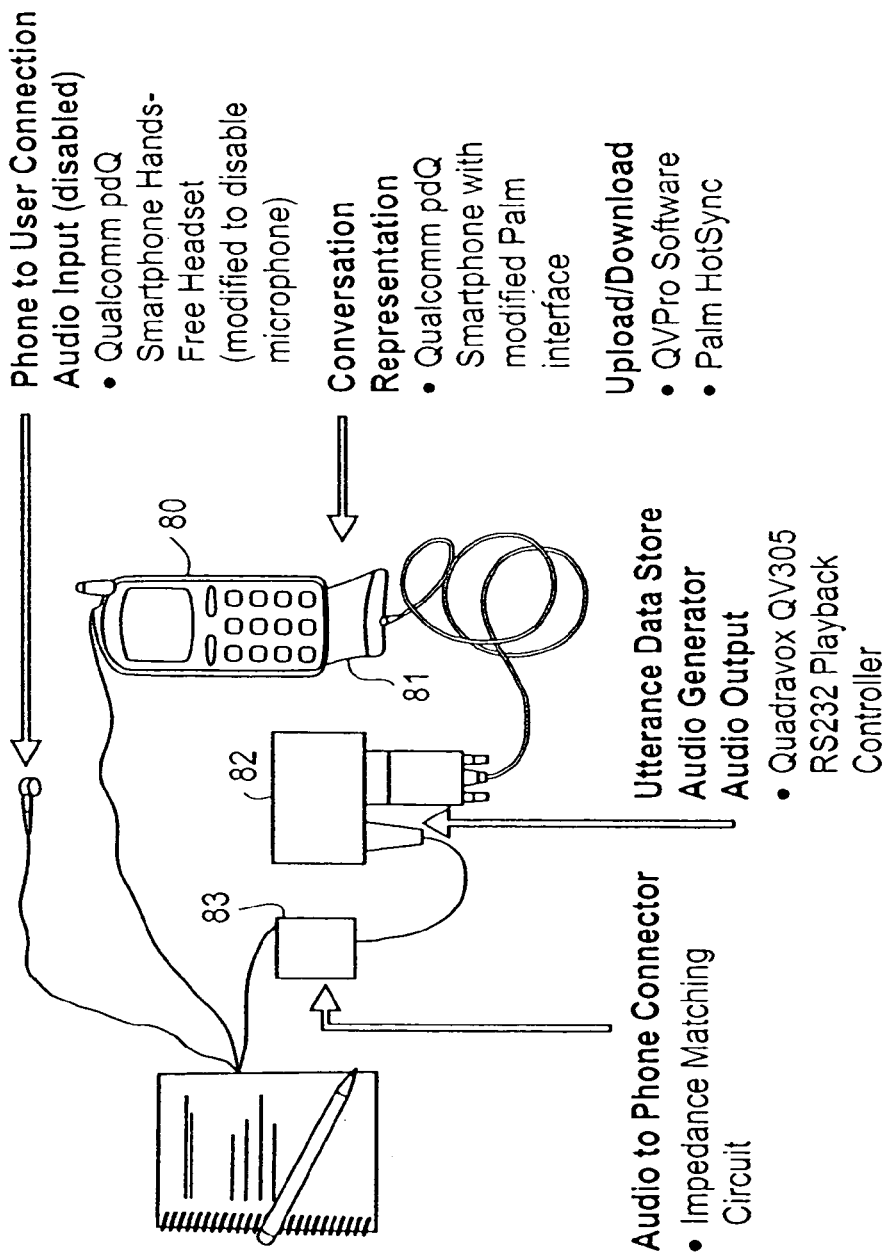
FIG. 8 illustrates a Quiet Call personal digital assistant ("PDA") according to an embodiment of the present invention.

A PDA embodiment is illustrated in FIG. 8 and includes PDA 80 and PDA interface 81. PDA interface 81 is coupled to a controller 82. Audio output of controller 82 is then coupled to audio-to-phone connector 83. Examples of specific structure of the various components of the PDA embodiment are described below.

Figure 9:
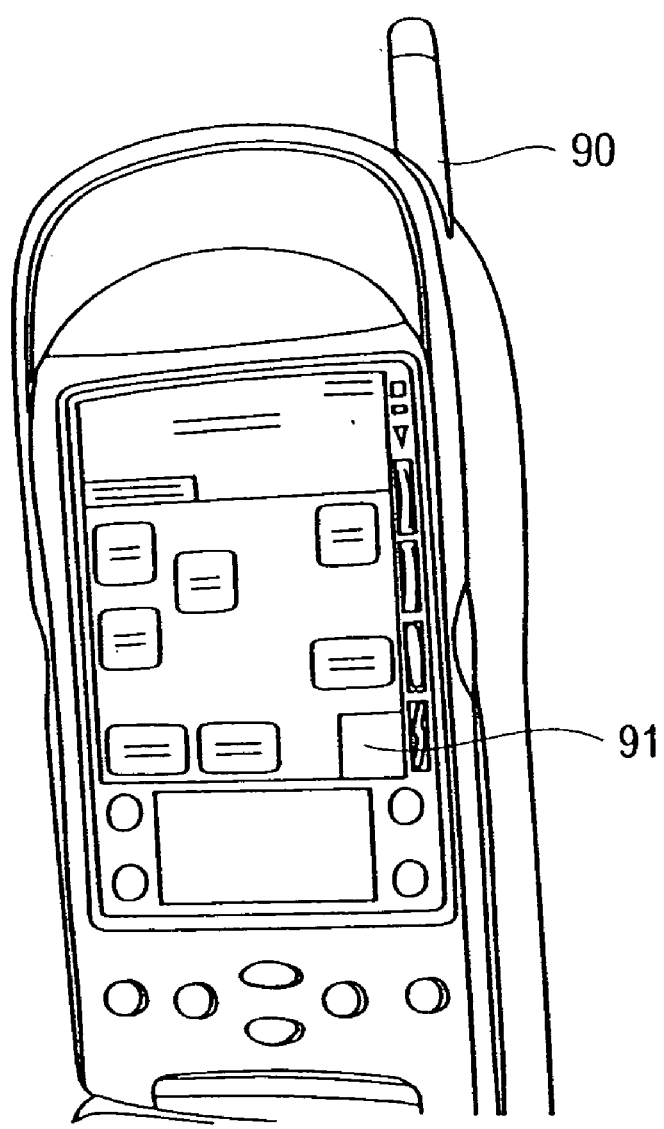
FIG. 9 illustrates a mobile telephone displaying a Quiet Call GUI according to an embodiment of the present invention.

FIGS. 8 and 9 illustrate a PDA embodiment (e.g., Qualcomm pdQ Smartphone having hands-free headset). PDA 80 uses a GUI as seen in FIG. 7 whose nodes indicate audio clips. For example, indicators may be sequence numbers or addresses for digitally stored signal data (e.g. WAV-formatted data stored in a Quadravox 305 Playback Module).

In an embodiment, a controller 82 (e.g., Quadravox QV305) stores audio clips that may be accessed randomly or sequentially. In an embodiment, controller 82 is a Quadravox QV305 RS232 playback controller. In alternate embodiments, controller 82 communicates by a wired/wireless Universal Serial Bus ("USB"), IrDA connection, parallel port, ethernet, local area network, fiber wireless device connection (e.g. Bluetooth), in combination or singly. A PDA embodiment also includes upload/download 40 such as QVPro software supplied by Quadravox, Inc. Controller 82 is connected to a telephone input through an impedance matching circuit as illustrated in FIG. 5 that permits the PDA audio signals to be directed into the telephone. In an embodiment $R_1$=10K ohms, $R_2$=460 ohms, and $C_1$=0.1 microfarads. PDA 80 is coupled to controller 82 through an RS232 serial port. The audio clip number indicated by selection on the PDA interface is communicated to controller 82 through the PDA serial port. The generated conversations are audible both in the hands-free earpiece and through the telephone line, but no outside content is produced directly by the local user to the local area.

In an embodiment, conversation structure consisting of a spatially group collection of PDA software buttons 91 is shown in FIG. 9. A representative sample of conversation representation is shown, including: greetings (e.g., hello, goodbye); conversational flow control (e.g., wait, continue); and common answers to questions (e.g., yes, no).

C. Paper User Interface Embodiment

Figure 10:
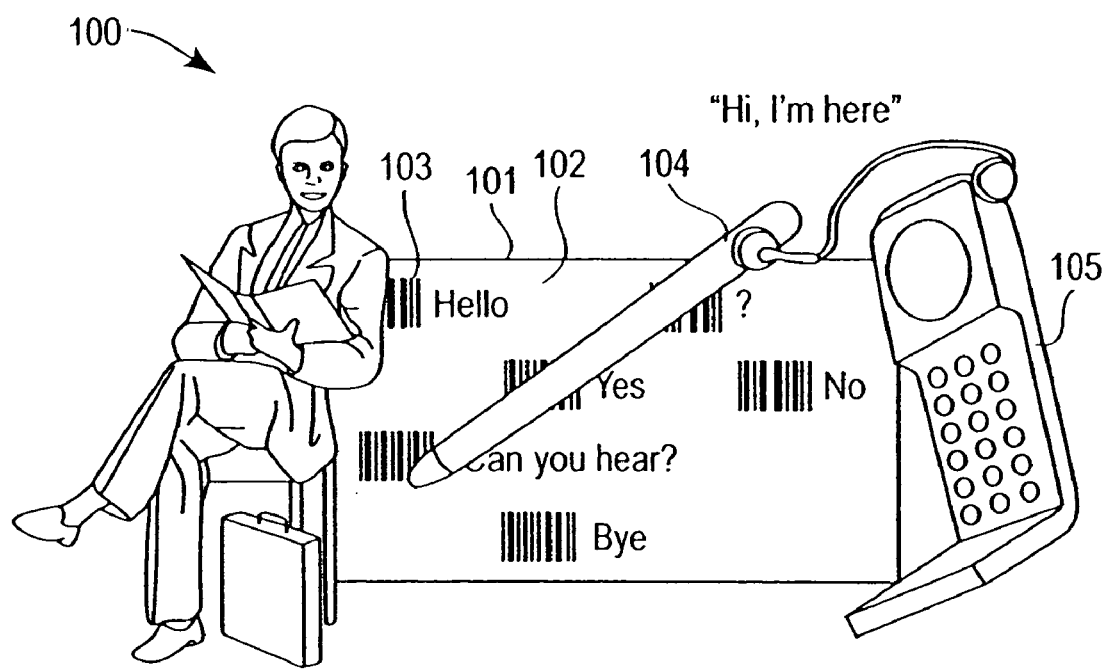
FIGS. 10–11 illustrates a Quiet Call processing device and scanner according to an embodiment of the present invention.
Figure 11:
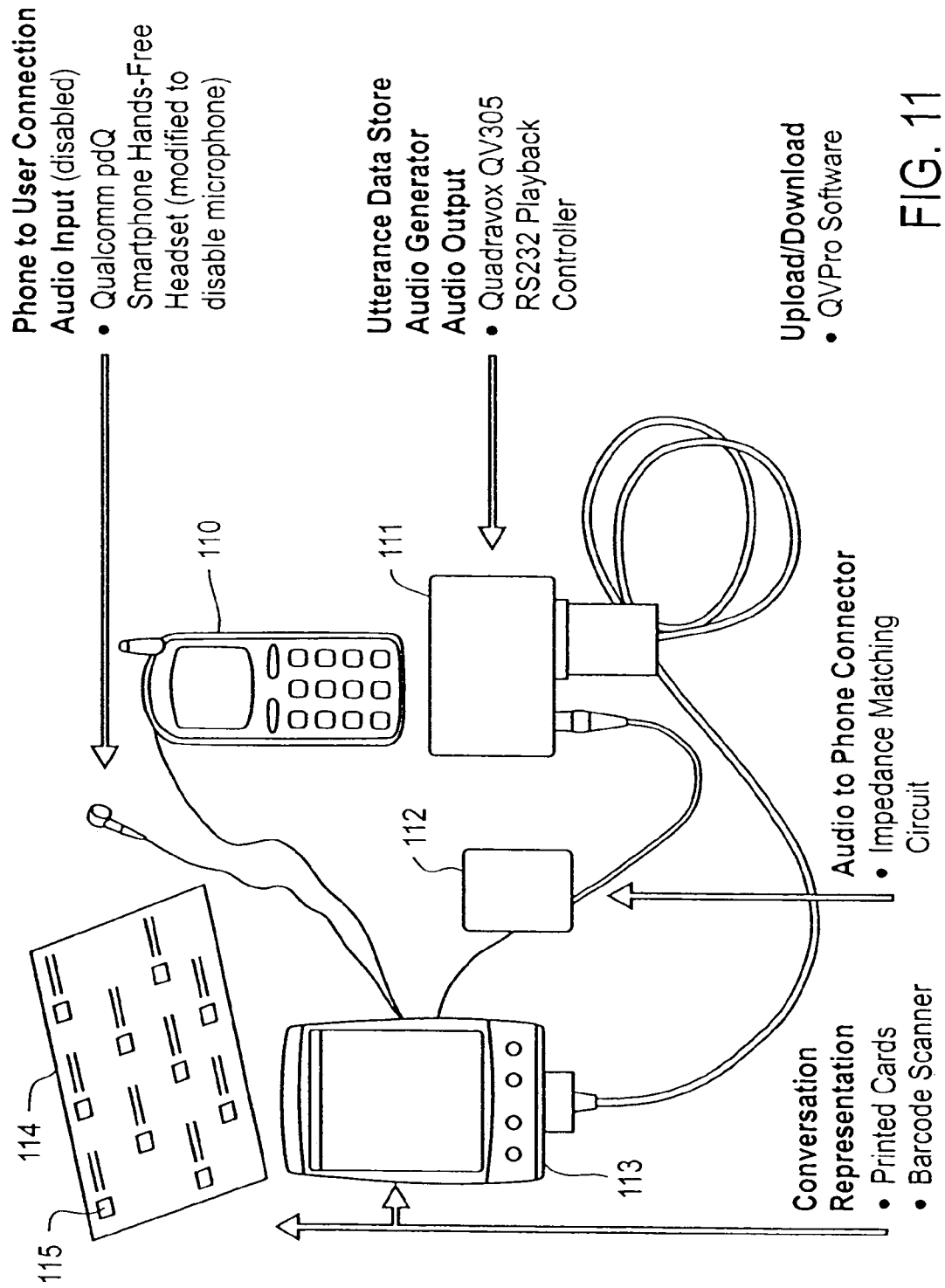
Figure 12:
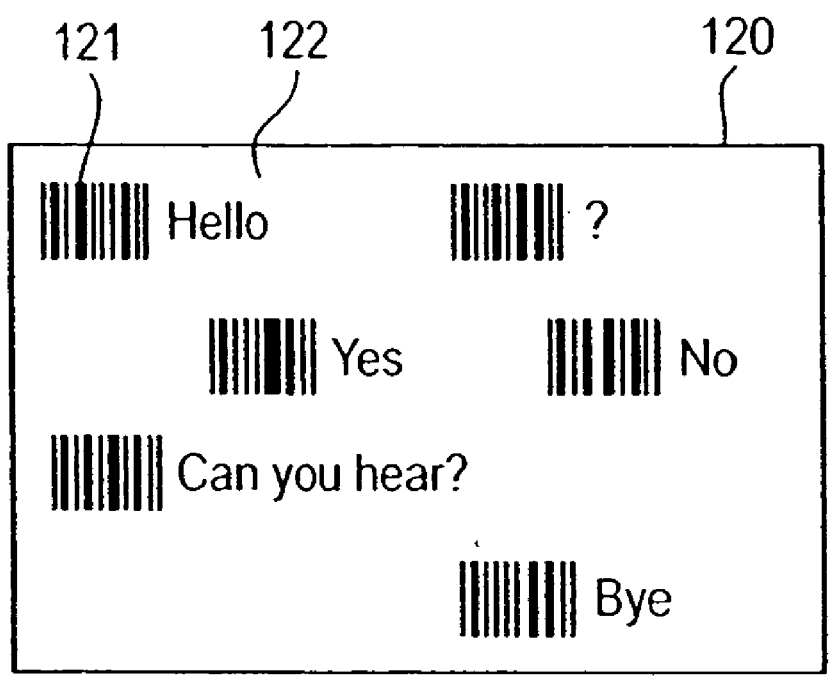
FIG. 12 illustrates a paper having bar codes as conversation representations used in a Quiet Call processing device and scanner according to an embodiment of the present invention.

In a paper user interface embodiment, conversation representation is printed on paper (e.g., notebook or cards) as illustrated in FIGS. 10, 11 and 12. A user scans (e.g., barcode or glyph reader) the conversation elements associated with the conversation representation (e.g. codes) and the computer 'talks' silently into the telephone through an audio connection.

FIG. 11 illustrates a paper user interface Quiet Call embodiment. The paper user interface embodiment includes PDA 110 and controller 111. In an embodiment, controller 111 is used as an utterance data store 33, audio generator 34 and audio output 41. In an embodiment, controller 111 is a Quadravox QV305 RS232 playback controller. A paper user interface embodiment also includes upload/download 40 such as QVPro software supplied by Quadravox, Inc. Controller 111 is coupled to audio-to-phone connector 112. In an embodiment, audio-to-phone connector 112 is an impedance matching circuit as illustrated by FIG. 5. Scanner 113 is also coupled to controller 111. Scanner 113 is used to read paper interface 114, including codes 115.

FIG. 12 also illustrates another embodiment of a paper interface. Paper interface 120 includes codes 121 (or conversation elements) for conversation representations such as "Hello."

In FIG. 11, a scanner 113 such (such as a Symbol SPT-1500 barcode scanner) is used to read conversational elements. In an embodiment, a scanner 113 is coupled to controller 111 through an RS232 port. Each code indicates an audio clip (WAV format) associated with the conversation representation.

A controller 111 (e.g., Quadravox QV305 RS232 Playback Controller) stores audio clips that may be accessed randomly or sequentially. Controller 111 is connected to a telephone input through an impedance matching circuit 112 which permits the audio signals to be directed into the telephone. In an embodiment, $R_1$=10K ohms, $R_2$=460 ohms, and $C_1$=0.1 microfarads. The audio clip number indicated by selection on the PDA interface is communicated to controller 111 through a PDA RS232 serial port. The generated conversations are audible both in the hands-free earpiece and through the telephone line, but not in the general locale of the user.

D. Telephone Accessory Embodiment

In a telephone accessory embodiment, physical interfaces such as labeled buttons are conversation representations. A device is attached to a telephone as a telephone accessory or may be incorporated into the design of a telephone mechanism itself. A user pushes a conversation button and the computer 'talks' silently into the telephone through an audio connection.

Figure 13:
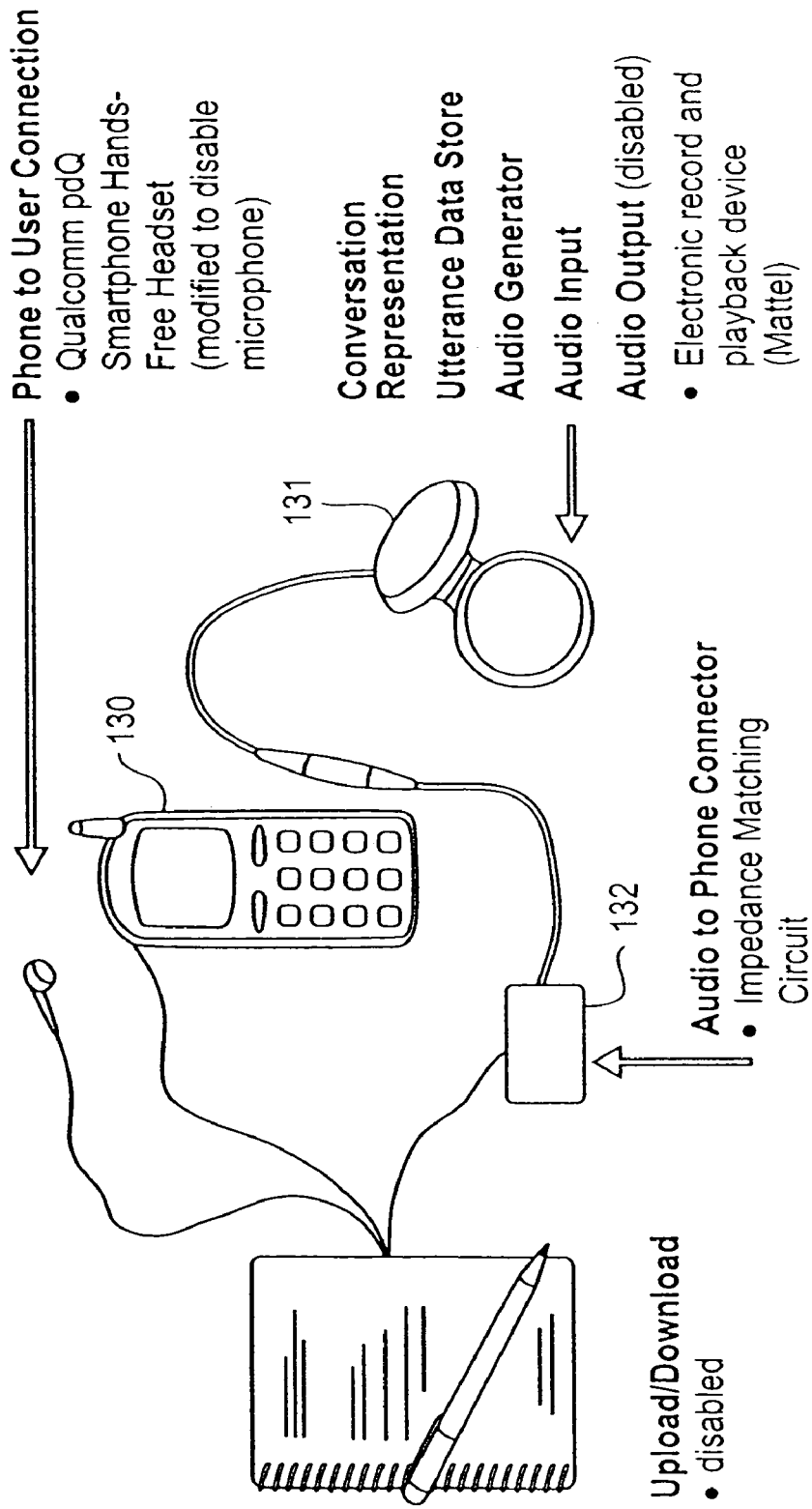
FIG. 13 illustrates a Quiet Call telephone accessory device according to an embodiment of the present invention.

FIG. 13 illustrates a telephone accessory embodiment of the present invention. The telephone accessory embodiment includes mobile telephone 130 coupled to device 131 which is coupled to audio-to-phone connector 132. Device 131 is a physical interface having labeled or marked buttons as respective conversation representations.

In a telephone accessory embodiment, the mobile telephone 130 is a Qualcomm PDQ Smartphone having a hands-free headset. In a telephone accessory embodiment, device 131 is an electronic record and playback device. In an embodiment, audio-to-phone connector 132 is an impedance matching circuit as illustrated by FIG. 5.

In an embodiment, one or more single-channel audio record and playback chips (e.g., Radio shack™ Recording Keychain) stores the audio that may be accessed through the labeled control buttons. The chips are connected to the telephone input through audio-to-phone connector 132 which permits the audio signals to be directed into the telephone. In an embodiment, audio-to-phone connector 132 is an impedance matching circuit as illustrated in FIG. 5 having $R_1$=10K ohms, $R_2$=460 ohms, and $C_1$=0.1 microfarads. The generated conversations are audible both in the hands-free earpiece and through the telephone line, but not in the general locale of the user.

A one-chip version can hold a single greeting or multiple greetings that may be used to defer the conversation until the user moves to an area where full-voice conversation may resume. Other chips may be added for alternative greetings (e.g., mobile call screening) or limited responses (e.g., yes, no, etc.).

In an alternate embodiment, a talking object is provided. For example, a credit card having Quiet Call technology (e.g. by using the described chip arrangement) generates an audible utterance (e.g. an account number) quietly. Hence, private information will not be overheard when being used to confirm reservations or other purposes.

E. Telecommunications Infrastructure Embodiment

Figure 14:
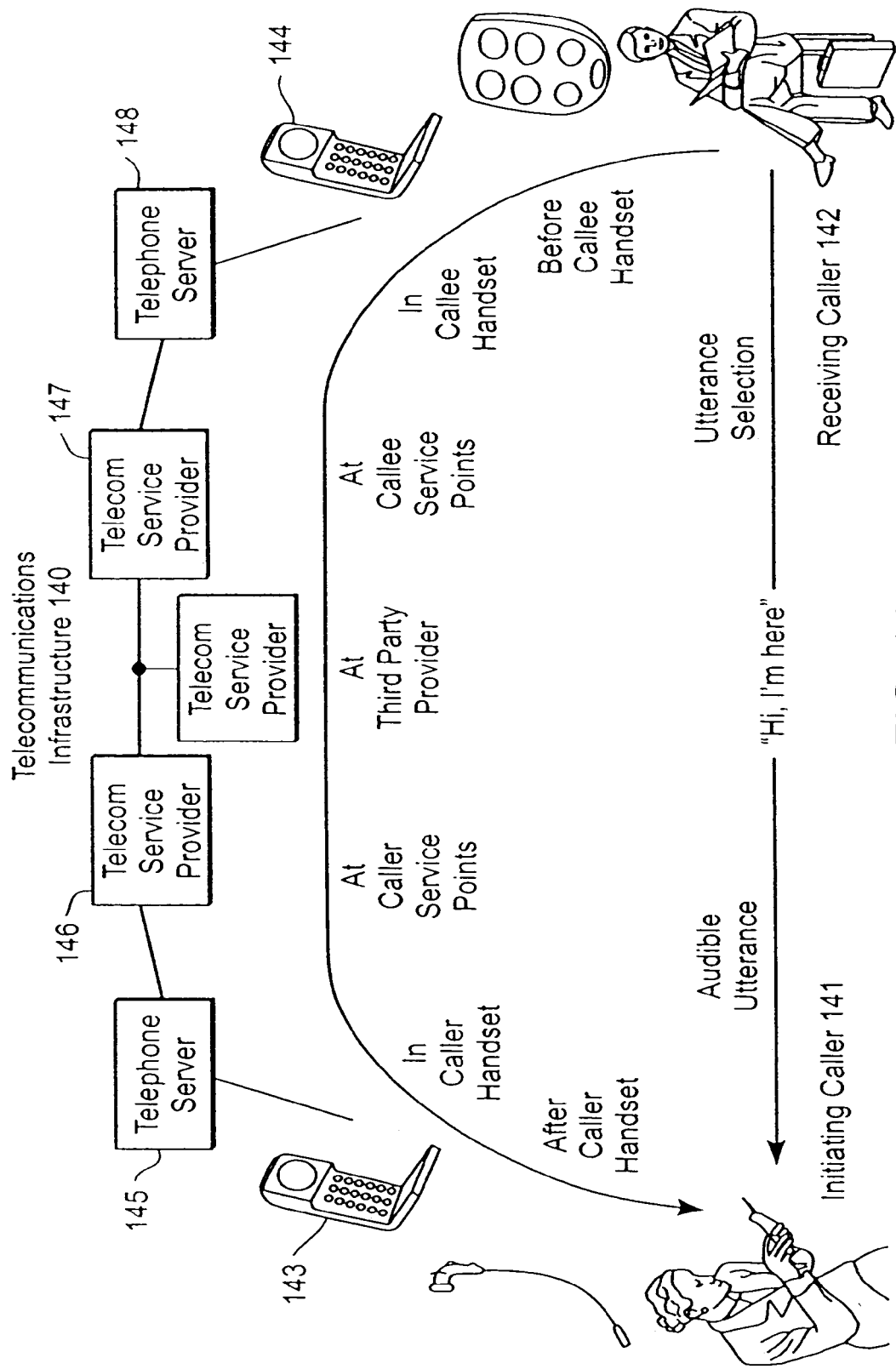
FIG. 14 illustrates a Quiet Call telecommunications infrastructure according to an embodiment of the present invention.

As described above, a voice call is conducted where at least one of the telephones has a non-verbal interface (e.g., buttons or touchscreen). The non-verbal interface is used to select and play voice utterances (recorded or synthetic) over the telephone connection. There are a number of places where audio production maybe introduced in the call's voice path as illustrated by FIG. 14. In an embodiment, receiving caller 142 is a mobile telephone user who needs to take important calls, but is not always in a situation where conversation is appropriate (e.g., meetings, public transportation, waiting areas).

FIG. 14 illustrates a telecommunications infrastructure 140 having Quiet Call technology. Telecommunications infrastructure 140 includes a telephone 143 used by initiating caller 141. Telephone 143 accesses telecom service provider 146. Telephone 143 optionally accesses telephony server 145 that is coupled to telecom service provider 146. In an embodiment, telecom service provider 146 accesses telecom service provider 147, which controls telephony server 148. Telephony server 148 then provides services to mobile telephone 144. Software and/or mechanical devices anywhere along the telecommunications infrastructure 140 may be used to implement embodiments of the Quiet Call technology. For example, Quiet Call software may be implemented at telecom service provider 147. The user then may initiate utterances by selecting buttons on mobile telephone 144.

In alternate embodiments, Quiet Call software and/or structures as described above may be positioned at other sections along the telecommunications infrastructure 140, such as in telephone 144 and/or 143.

i. In-Band and Out-of-Band Utterance Selection

There are at least two Quiet Call telecommunication infrastructure embodiments: 1) control signals for utterance selections made by a caller are mixed with the voice audio (i.e., in-band communication such as touch tones) or 2) control signals use a communication channel different from the voice signal (i.e., out-of-band). In both embodiments a server application capable of generating Quiet Call utterances has access to a telecommunications infrastructure and can manipulate the contest of the voice path of a call (e.g., a telephone server of a service provider) as illustrated in FIG. 14.

a. In-Band Selection for Adding Voice Audio

Figure 16A:
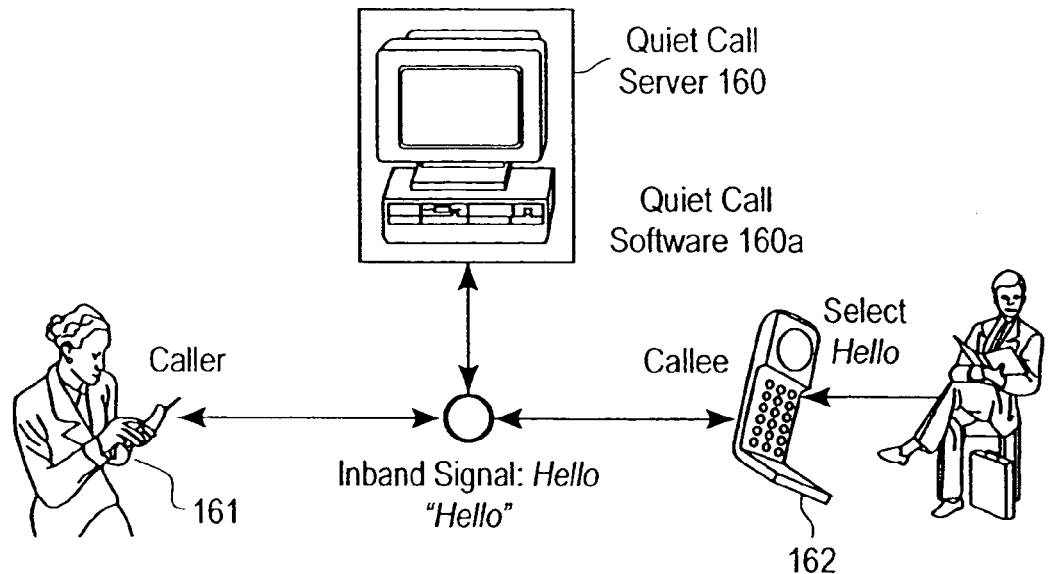
FIGS. 16*a–b* illustrates a Quiet Call in-band telecommunication infrastructure according to an embodiment of the present invention.
Figure 16B:
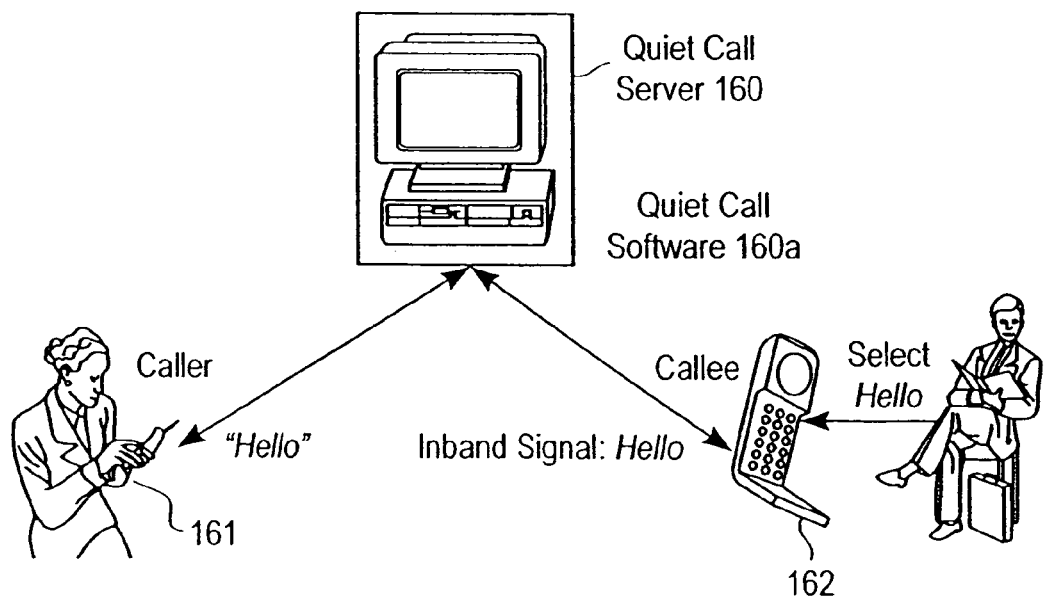

FIGS. 16*a–b* illustrate in-band telecommunication infrastructure embodiments and a Quiet Call server.

If a telephone supports a text display, a set of possible utterances is displayed on a telephone. The text is either configured with the telephone, obtained previously from a telecommunication provider (e.g., downloaded in a previous voice or data call), obtained or customized during a current call. Communication could be through telephone information fields such as caller ID or through in-band signaling such as Dual-Tone Multi Frequency ("DTMF"), for touch tone signaling, fax tones, or a custom signaling technique that is in some way more audibly appealing (e.g., rhythmic or musical sequences).

If a telephone supports dedicated selection keys, these may be used to navigate the conversation element selections. When one of the options is selected, a message with the encoded selection is sent back to the provider with in-band signaling. The selection message is used to access the corresponding conversation element.

If the telephone does not support selection keys, the standard numeric pad may be used for the selection (e.g., *,1,2, etc.). The associated DTMF signal might be suppressed from the other party by carrier or provider specific mechanisms or by briefly putting the initiating caller on hold while the DTMF is being processed. Alternatively, the telephone could support alternative tone generation that is not so audibly disturbing (e.g., other frequency or rhythmic patterns.)

In an embodiment, a receiving caller's telephone 162 would have the quiet call technology to access a Quiet Call server 160 and Quiet Call Systems 160*a* as illustrated in FIG. 16*b*.

In an alternative embodiment, an initiating caller's telephone 160 would have the quiet call technology to access a Quiet Call server 160 and Quiet Call Systems 160*a* as illustrated in FIG. 16*b*.

In an alternative embodiment, a third party provider is brought into the call (most likely by the receiving caller) as illustrated in FIG. 16*a*. In this case, a conference call would be established to accept a receiving caller conversation element selection signals (most likely as DTMF or other audible pattern) and translate them into corresponding audible utterances.

The following describes various in-band telecommunication infrastructure embodiments. First, a proxy answer at a Quiet Call server embodiment may be used. A call to a mobile telephone is actually first placed through a service number. This may be made transparent to initiating caller 161 by providing the service number as the point of contact. A Quiet Call server 160 (e.g., telephony program or service provider function) answers the incoming call and dials a receiving caller's mobile telephone 162. Receiving caller 162 answers mobile telephone 162 and completes a connection to the initiating caller 161. The receiving telephone 162, then quickly makes a connection to Quiet Call server 160 (e.g., through a conference call or as a relay with the server application acting as an intermediary, as shown in FIGS. 16*a–b*).Receiving caller 162 makes Quiet Call input selections that are signaled to Quiet Call server 160 for decoding and translation to the appropriate audible utterance: The in-band signaling may itself be audible to initiating caller 161 (e.g., as in a continuous three-way conference call connection shown in FIG. 161) or may be screened from initiating caller 161 (e.g., as in a relay connection or shown in FIG. 16*b* or by quickly putting the initiating caller 161 momentarily on hold during control signal progressing.

Second, a third party add-in from mobile handset may be used in an embodiment. A call is first placed directly to receiving caller's mobile telephone 162. Receiving caller answers mobile telephone 162 and a connection is made with initiating caller 161. The telephone quickly makes a connection with a quiet call server 160 (e.g., by dialing in a conference call or relay connection or by accessing a persistent conference call or relay connection). In-band signaling and utterance generation then proceeds in a manner similar to that described above.

In-band signaling has the advantage that only one communication channel is required for both voice and data communication and it can work without modification of the telecommunications infrastructure (e.g., DTMF support is already in the system). Under certain circumstances, an audible signaling might be helpful in giving some initiating callers audible cues about the receiving callers situation. The disadvantages are in requiring most initiating callers to either put up with the audible control signals they do not want to hear (e.g., by ignoring or disguising them) or hide them from the initiating caller (e.g., putting the initiating caller on hold during control signal processing). In-band signaling is also limited to how much and how quickly control data can be communicated through the audible channel.

b. Out-of-Band Selection for Adding Voice Audio

Figure 17:
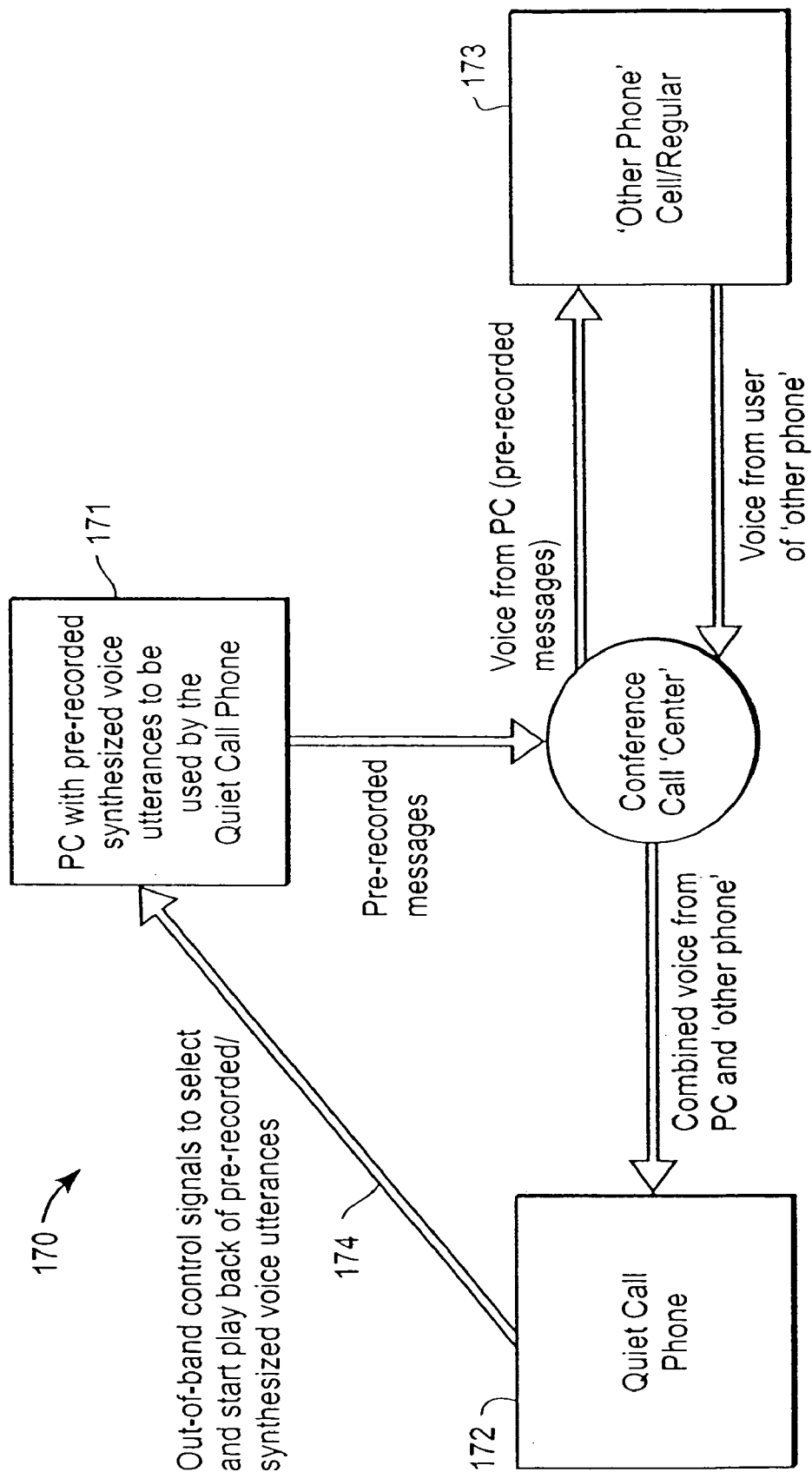
FIG. 17 illustrates a Quiet Call out-of-band telecommunication infrastructure according to an embodiment of the present invention.

A selected conversation element may be communicated to a Quiet Call server through some means other than a voice channel of the telephone call. FIG. 17 illustrates an out-of-band telecommunication infrastructure embodiment 170. As with in-band signaling, a call may be placed through a service number (proxy answer approach described above) or directly to the receiving caller's mobile telephone (third-party add-in). A Quiet Call server is either connected to the voice call through a conference call or relay configuration.

The following describes out-of-band control embodiments.

First, a related voice and data connections embodiment may be used. Telecommunication systems (such as Integrated Services Digital Network, ("ISDN") carry voice and data on separate channels. For example, instead of the telecommunication provider sending a ring voltage signal to ring a bell in your telephone (in-band signal), the provider sends a digital packet on a separate channel (out-of-band signal). A call is processed by a telecommunications service provider by establishing a voice channel and a related control data stream. Control information is sent to a Quiet Call server independently from a voice communication using a alternate data channel. A Quiet Call server, being in connection with the voice path, introduces the appropriate utterances as described above.

Second, a digital communication, such as Code Division Multiple Access ("CMDA") and Voice-over-IP ("VoIP"), encode voice and data as bits and allow for simultaneous communication by interleaving the packets on the digital channel.

Third, a separate data connection embodiment may be used. In an embodiment, a handset is set up with a separate data connection or a second device (e.g., wirelessly connected PDA) to communicate control information between a receiving caller and Quiet Call server.

Fourth, an additional telephone connection embodiment maybe used. A handset is set up with a multiple telephone capability or several telephones could be used. One call would communicate control information between a receiving caller and Quiet Call server 171. The other telephone 173 would have a connection between all parties (initiating caller, receiving caller, and server application).

Fifth, when using a channel supporting simultaneous mixed digital voice and data (e.g., VoIP combined with an IP-enabled phone acting as the Quiet Call Phone), synthetic or pre-recorded conversation elements may be stored as simple data packets on a telephone handset. For a receiving caller to obtain an audio utterance, prerecorded data sets are injected into a initiating caller's digital data stream.

Out-of-band signaling has the advantage that the control signals do not have to be hidden (e.g., through temporarily holding the initiating caller), disguised (e.g., as rhythmic patterns), or endured (e.g., touch tones). The disadvantage is that several communication channels require management, except in the case of intermixed voice and data packet communication (e.g., VoIP).

ii. VoIP Telecommunication Infrastructure

VoIP is the ability to make telephone calls and send faxes over IP-based data networks with a suitable quality of service (QoS) and superior cost/benefit. see http://www.protocols.com/papers/voip.htm and http://www.techquide.com. Voice data is encoded into data packets and sent using Internet Protocol.

Net2phone's (http://www.net2phone.com) Parity software (http://www.paritysw.com/products/spt_ip.htm) "PC with Voice Software" provides a VoIP telephony development Application Program Interface ("API") according to an embodiment of the invention.

In a VoIP embodiment, information is transferred by way of the internet, telephone switches and/or local networks. FIGS. 18a–18e illustrate various telecommunication infrastructure embodiments using VoIP functionality. The infrastructure embodiments differ in where the Quiet Call voice utterances are stored/generated and in whether the phones used in Quiet Calls dialogue are IP-enabled. Table A shows 5 different configurations related to the various infrastructures embodiments illustrated in FIGS. 18a–18e.

TABLE A

Figure 18A:
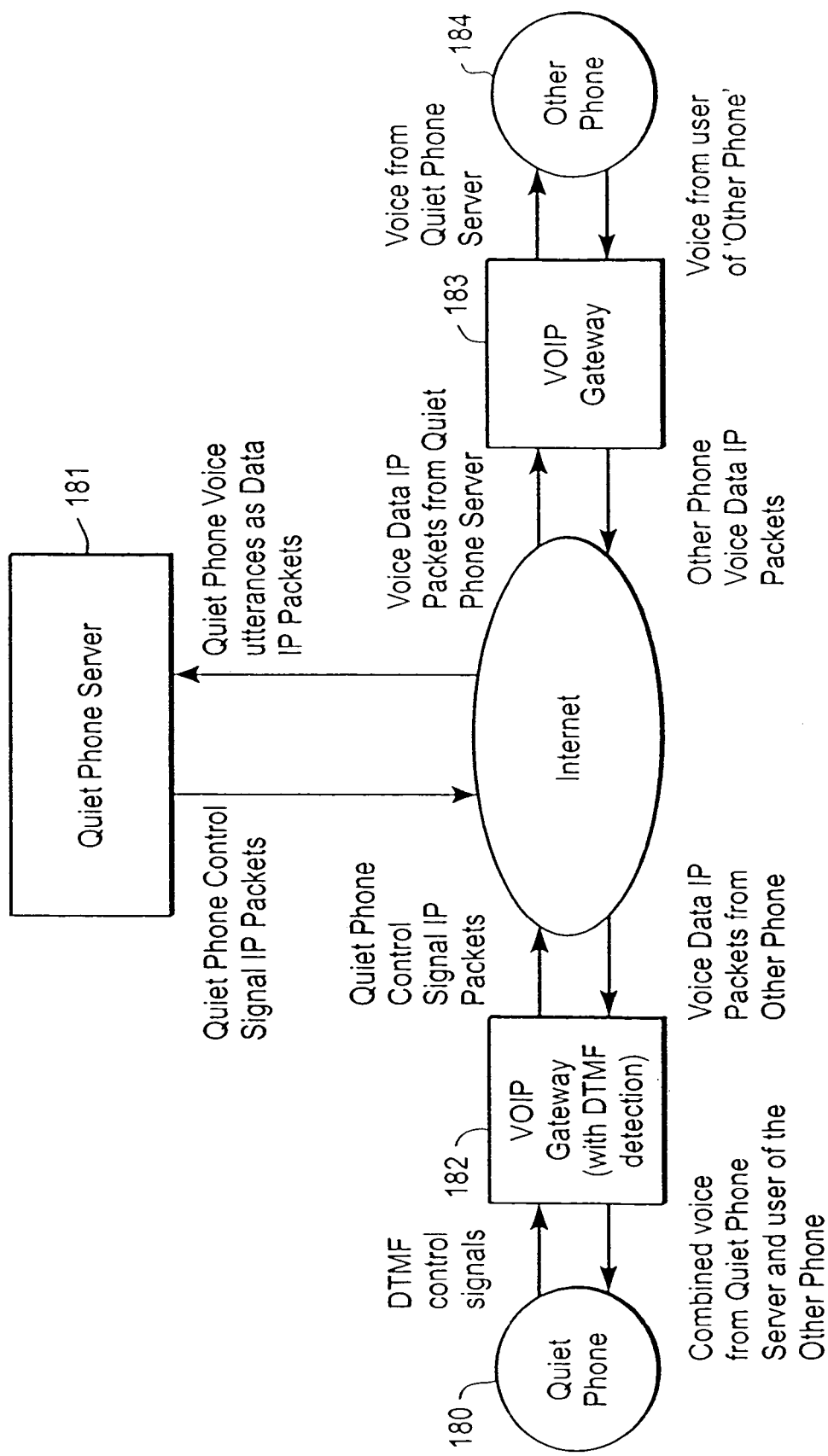
FIGS. 18*a–e* illustrate a VoIP telecommunication infrastructure according to an embodiment of the present invention.
Figure 18B:
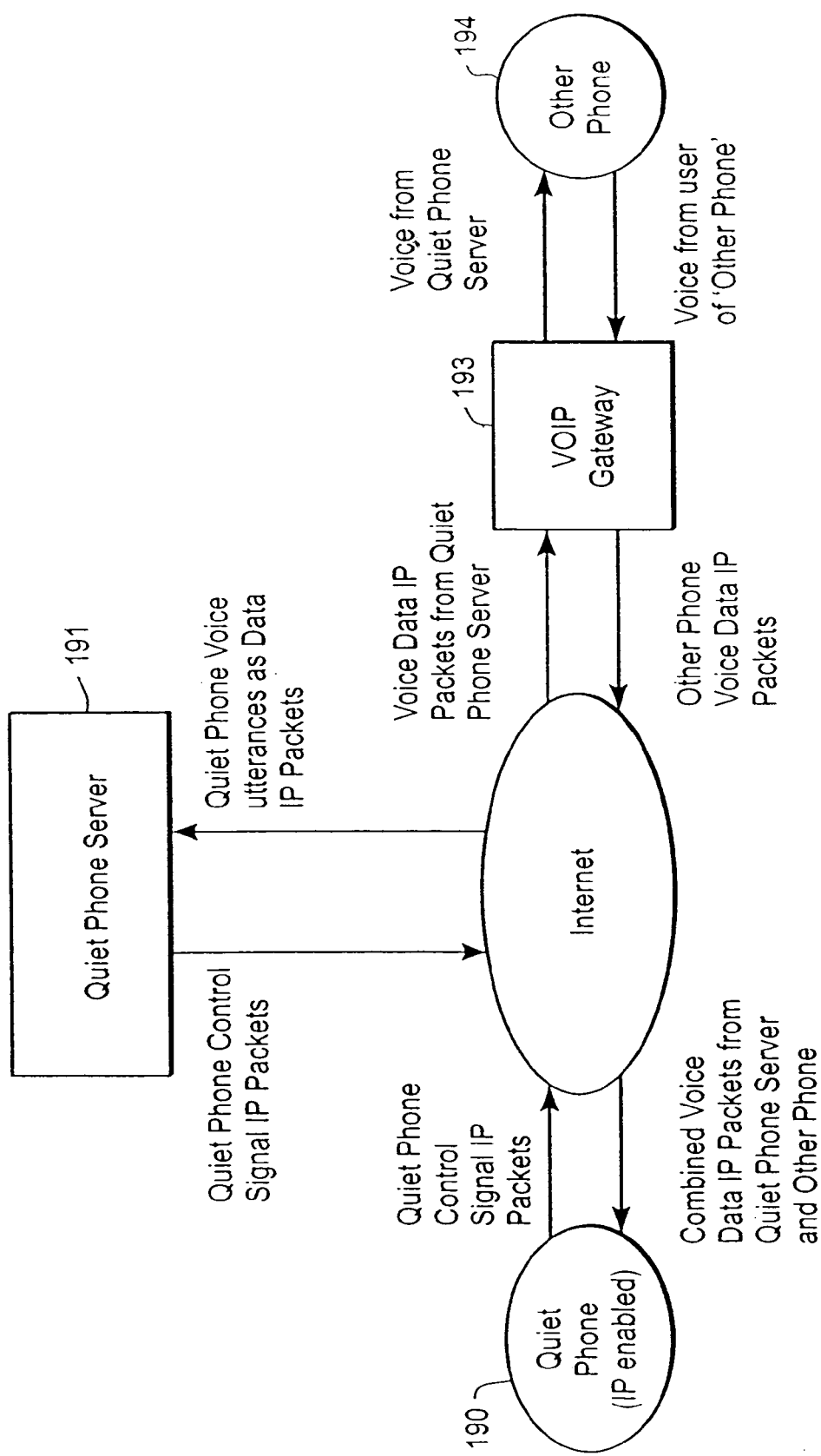
Figure 18C:
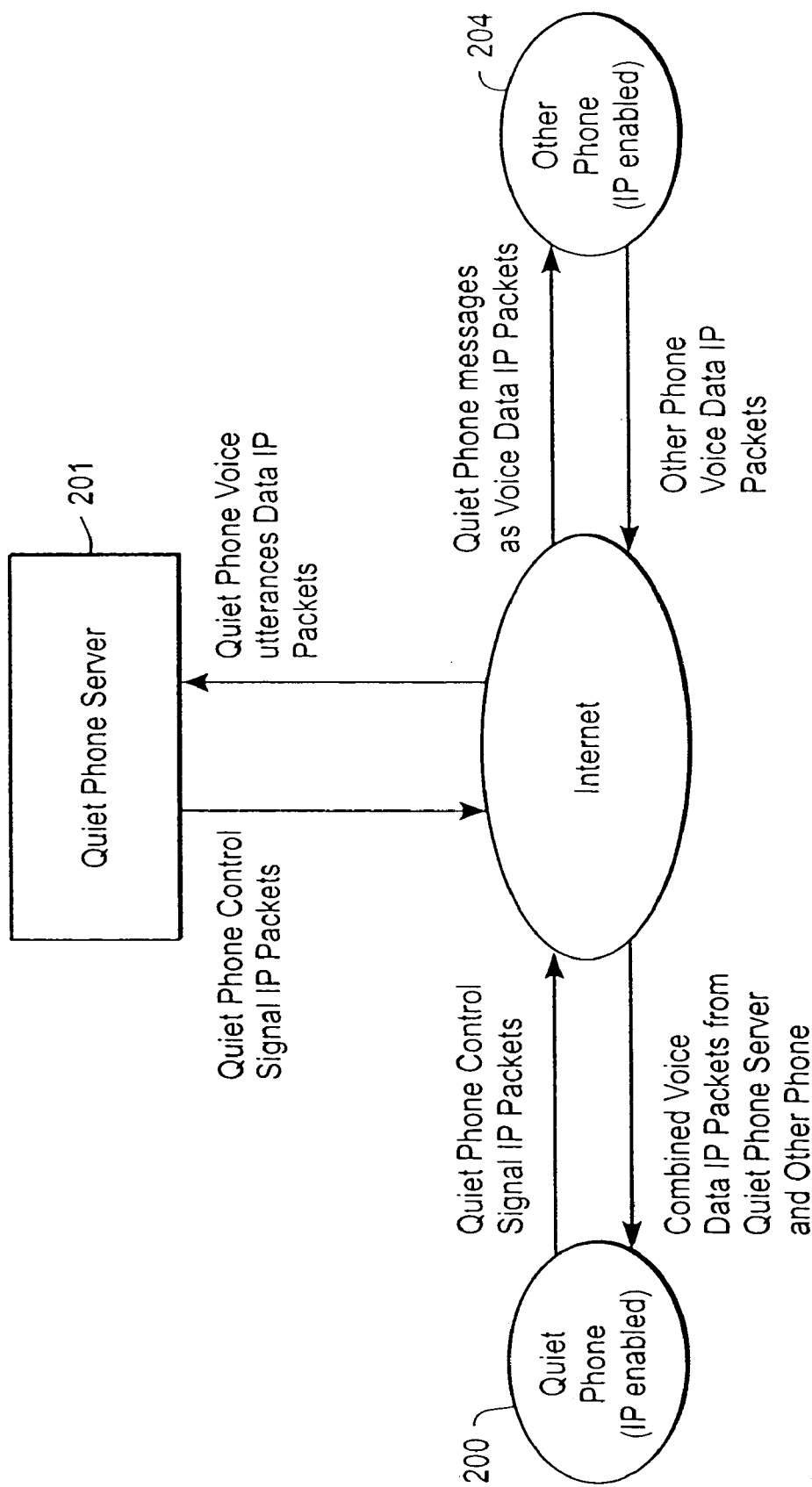
Figure 18D:
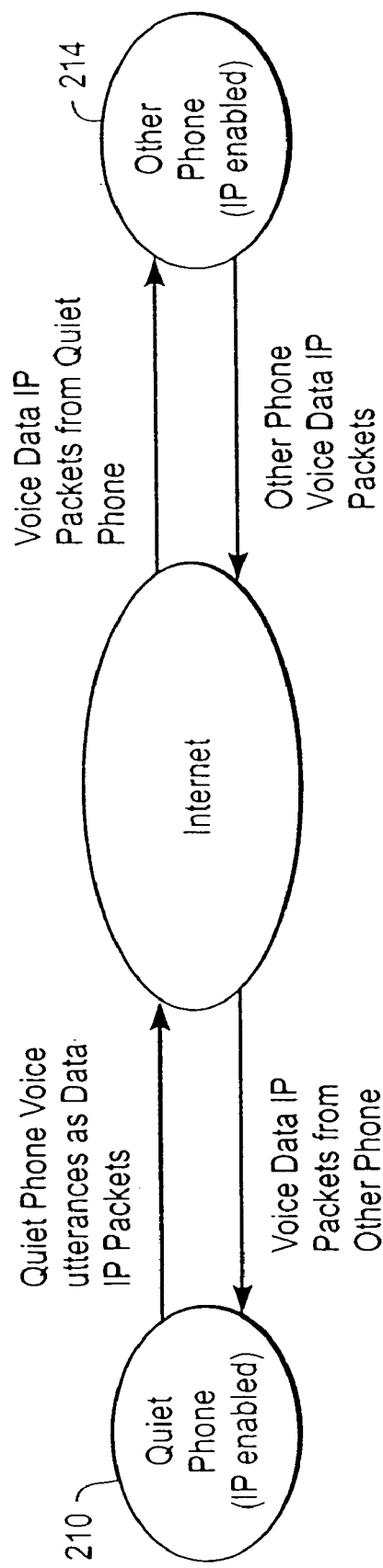
Figure 18E:
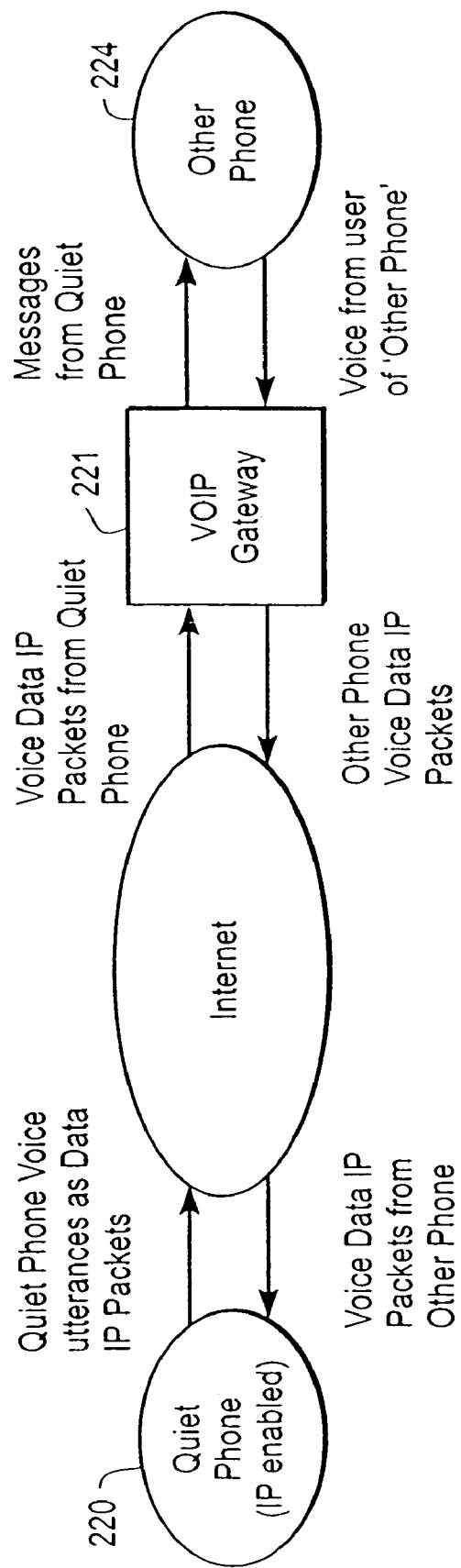

| Quiet Phone IP-enabled (yes/no) | Other Phone IP-enabled (yes/no) | Voice Utterances stored/generated on the Quiet Phone (yes/no) | Figure illustrating the telecommunication infrastructure |
|---|---|---|---|
| No | No | No | FIG. 18a |
| Yes | No | No | FIG. 18b |
| Yes | Yes | No | FIG. 18c |
| Yes | Yes | Yes | FIG. 18d |
| Yes | No | Yes | FIG. 18e |

In FIG. 18a a non-IP-enabled telephone 180 capable of issuing DTMF signals acts as a Quiet Phone and controls the playback/generation of voice utterances from a Quiet Phone server 181 via a VoIP gateway 182. The DTMF control signals are detected by VoIP gateway 182 and routed to the Quiet phone server 181 as IP data packets with the appropriate Quiet Call control codes. The Quiet Phone server 181 receives the IP data packets with the Quiet Call control codes and responds by sending the stored/generated Quiet Call voice utterances as IP data packets to (a) VoIP gateway 183 communicating with the Other phone 184 and (b) VoIP gateway 182 communicating with Quiet phone 180. Voice from Other phone 184 goes to VoIP gateway 183 and is routed to the Quiet phone as IP data packets to the VoIP gateway 182 communicating with Quiet phone 180.

In FIG. 18a, any telephone capable of generating DTMF signals can be turned into a Quiet Phone by simply subscribing to the Quiet Phone service residing on Quiet Phone server 181.

In FIG. 18b, an IP-enabled telephone 190 acts as the Quiet Phone and controls the playback/generation of voice utterances from the Quiet Phone server 191 by sending Quiet Call control codes as IP data packets to the Quiet Phone server 191. The Quiet Phone server 191 receives the IP data packets with the Quiet Call control codes and responds by sending the stored/generated Quiet Call voice utterances as IP data packets to (a) VoIP gateway 193 communicating with the Other phone 194 and (b) the IP-enabled Quiet phone 190. Voice from the Other phone 194 goes to the VoIP gateway 193 and is routed to the Quiet phone 190 as IP data packets.

In FIG. 18c, an IP-enabled telephone acts as a Quiet phone 200 and controls the playback/generation of voice utterances from a Quiet Phone server 201 by sending Quiet Call control codes as IP data packets to the Quiet Phone server 201. The Quiet Phone server 201 receives the IP data packets with the Quiet Call control codes and responds by sending the stored/generated Quiet Call voice utterances as IP data packets to (a) the IP-enabled Other phone 204 and (b) the IP-enabled Quiet phone 200. Voice from the Other phone 204 is routed to the Quiet phone 200 as IP data packets.

In FIG. 18d, an IP-enabled telephone acts as the Quiet phone 210 and sends stored/generated Quiet Call voice utterances as IP data packets to the IP-enabled Other phone 214. Voice from the Other phone 214 is routed to the Quiet phone 210 as IP data packets.

In FIG. 18e, an IP-enabled telephone acts as the Quiet phone 220 and sends stored/generated Quiet Call voice utterances as IP data packets to VoIP gateway 221 communicating with the Other phone 224. Voice from the Other phone 224 goes to the VoIP gateway 221 and is routed to the Quiet phone 220 as IP data packets.

iii. Wireless Telephony Applications and Interfaces

In an embodiment, Wireless Telephony Applications Framework ("WTA") within a Wireless Application Protocol ("WAP") is used for a Quiet Call embodiment. For example, Quiet Call software is stored on a WTA server accessed from a microbrowser stored on a mobile telephone.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system for a telephone, comprising:
   (a) a mechanical device associated with a conversation representation;
   (b) a memory, coupled to the mechanical device, for storing a conversation element associated with a conversation representation and representing an audible utterance for a remote listener in an ongoing, interactive conversation in a quiet mode of the system;
   (c) a processor coupled to the memory and to the mechanical device and including an audio generator, the processor for generating the audible utterance in response to a user interaction with the mechanical device during a user's use of the quiet mode;
   (d) a physical switch for use by the user to switch between said quiet mode and an active, direct audio input mode of the user, without putting the remote listener on hold, wherein the active, direct audio input mode, is configured to accept live vocalizations by the user into the telephone and to transmit the accepted live vocalizations through the telephone;
   (e) a connection adapted to deliver signals appropriate for telephone transmission in either one of the quiet mode or the active, direct audio input mode; and
   (f) a recording device for recording audio input into the memory, wherein said audio input becomes associated with a conversation representation.

2. The system of claim 1, wherein the mechanical device is a first button.

3. The system of claim 1, wherein the connection is one of a direct electrical connection of signals, an electronically processed signal, an impedance matching circuit, an optical to electrical conversion, an infrared detection, and a muffled acoustic signal using an insulation.

4. The system of claim 1, further comprising:
   (g) an earpiece, coupled to the processor, for receiving the audible utterance and a voice of the remote listener.

5. The system of claim 1, further comprising:
   (g) an audio output for coupling to a mobile telephone input.

6. A system for a telephone, comprising:
   (a) a plurality of mechanical devices associated with a plurality of conversation representations;
   (b) a memory, coupled to the plurality of mechanical devices, for storing a plurality of conversation elements associated with the plurality of conversation representations and, each of said plurality of conversation elements representing an audible utterance to be transmitted to a remote listener in an ongoing, interactive conversation in a quiet mode of the system;
   (c) a processor coupled to the memory and to the plurality of mechanical devices and including an audio generator, the processor for generating an audible utterance in response to a user selection of a mechanical device from the plurality of mechanical devices during the user's use of the quiet mode;
   (d) a physical switch for use by the user to switch between said quiet mode and an active, direct audio input mode of the user, without putting the remote listener on hold, wherein the active, direct audio input mode is configured to accept live vocalizations by the user into the telephone and to transmit the accepted live vocalizations through the telephone;
   (e) a connection adapted to deliver signals appropriate for telephone transmission in either one of the quiet mode or the active, direct audio input mode; and
   (f) a recording device for recording audio input into the memory, wherein said audio input becomes associated with a conversational representation.

7. The system of claim 6, wherein a conversation element from the plurality of conversation elements represents an audible utterance that is configured to disclose to the remote listener that the user cannot conveniently speak, but wished for the remote listener to continue speaking.

8. The system of claim 6, wherein a conversation element from the plurality of conversation elements represents an audible utterance that is configured to respond to a query from the remote listener.

9. The system of claim 6, wherein a conversation element from the plurality of conversation elements represents an audible utterance that is configured to disclose to the remote listener that the user is ending the conversation and will contact the remote listener at a later time.

10. The system of claim 6, wherein the plurality of mechanical device includes a touch screen displaying text associated with a conversation element from the plurality of conversation elements.

11. A system for a telephone, comprising:
   (a) a plurality of mechanical devices associated with a plurality of conversation representations;
   (b) a memory, coupled to the plurality of mechanical devices, for storing a plurality of conversation elements, each said conversation element associated with one of said plurality of conversation representations and representing an audible utterance to be transmitted to a remote listener in an ongoing, interactive conversation in a quiet mode of the system;
   (c) a processor, coupled to the memory and to the plurality of mechanical devices and including an audio generator, the processor for generating an audible utterance in response to a user selection of a mechanical device from the plurality of mechanical devices during a user's use of the quiet mode;
   (d) a physical switch for use by the user to switch between said quiet mode and an active, direct audio input mode of the user, without putting the remote listener on hold, wherein the active, direct audio input mode is configured to accept live vocalizations by the user into the telephone and to transmit the accepted live vocalizations through the telephone;
   (e) a connection adapted to deliver signals appropriate for telephone transmission in either one of the quiet mode or the active, direct audio input mode; and
   (f) a recording device for recording audio input into the memory, wherein said audio input will be associated with a conversational representation.

* * * * *